United States Patent
Ogawa

(10) Patent No.: US 9,838,609 B2
(45) Date of Patent: Dec. 5, 2017

(54) IMAGE CAPTURING APPARATUS, CONTROL APPARATUS AND CONTROL METHOD FOR CONTROLLING ZOOMING FUNCTION

(71) Applicant: CANON KABUSHIKI KAISHA, Tokyo (JP)

(72) Inventor: Seiji Ogawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 14/808,752

(22) Filed: Jul. 24, 2015

(65) Prior Publication Data

US 2016/0028939 A1 Jan. 28, 2016

(30) Foreign Application Priority Data

Jul. 28, 2014 (JP) .................. 2014-153153

(51) Int. Cl.
*H04N 5/225* (2006.01)
*H04N 5/232* (2006.01)

(52) U.S. Cl.
CPC ..... *H04N 5/23296* (2013.01); *H04N 5/23222* (2013.01); *H04N 5/23293* (2013.01)

(58) Field of Classification Search
CPC ................. H04N 5/23296; H04N 5/23222
USPC ..................................... 348/220.1
See application file for complete search history.

(56) References Cited

U.S. PATENT DOCUMENTS

| 2011/0090341 A1* | 4/2011 | Ikewada .......... G08B 13/19608 348/152 |
| 2013/0076945 A1* | 3/2013 | Nagata ............... H04N 5/23296 348/240.2 |
| 2013/0120617 A1* | 5/2013 | Kim .................. H04N 5/23296 348/240.2 |

FOREIGN PATENT DOCUMENTS

| JP | 2008-211485 A | 9/2008 |
| JP | 2013-074454 A | 4/2013 |

* cited by examiner

*Primary Examiner* — Usman Khan
(74) *Attorney, Agent, or Firm* — Cowan, Liebowitz & Latman, P.C.

(57) ABSTRACT

An image capturing apparatus comprises an image capturing unit which captures an image, a display unit which displays a captured image, a detection unit which detects an object from a captured image, a first operation unit which accepts an operation for changing a size of an object, a setting unit which does not to change a set object size even when the first operation unit is operated while a moving image is being recorded and the captured image is being displayed, and changes a set object size based on an operation on the first operation unit during a moving image recording stand-by or before still image shooting and while the captured image is being displayed on the display unit, and a zooming control unit which automatically performs zooming such that an object fits within a screen according to a set size.

22 Claims, 13 Drawing Sheets

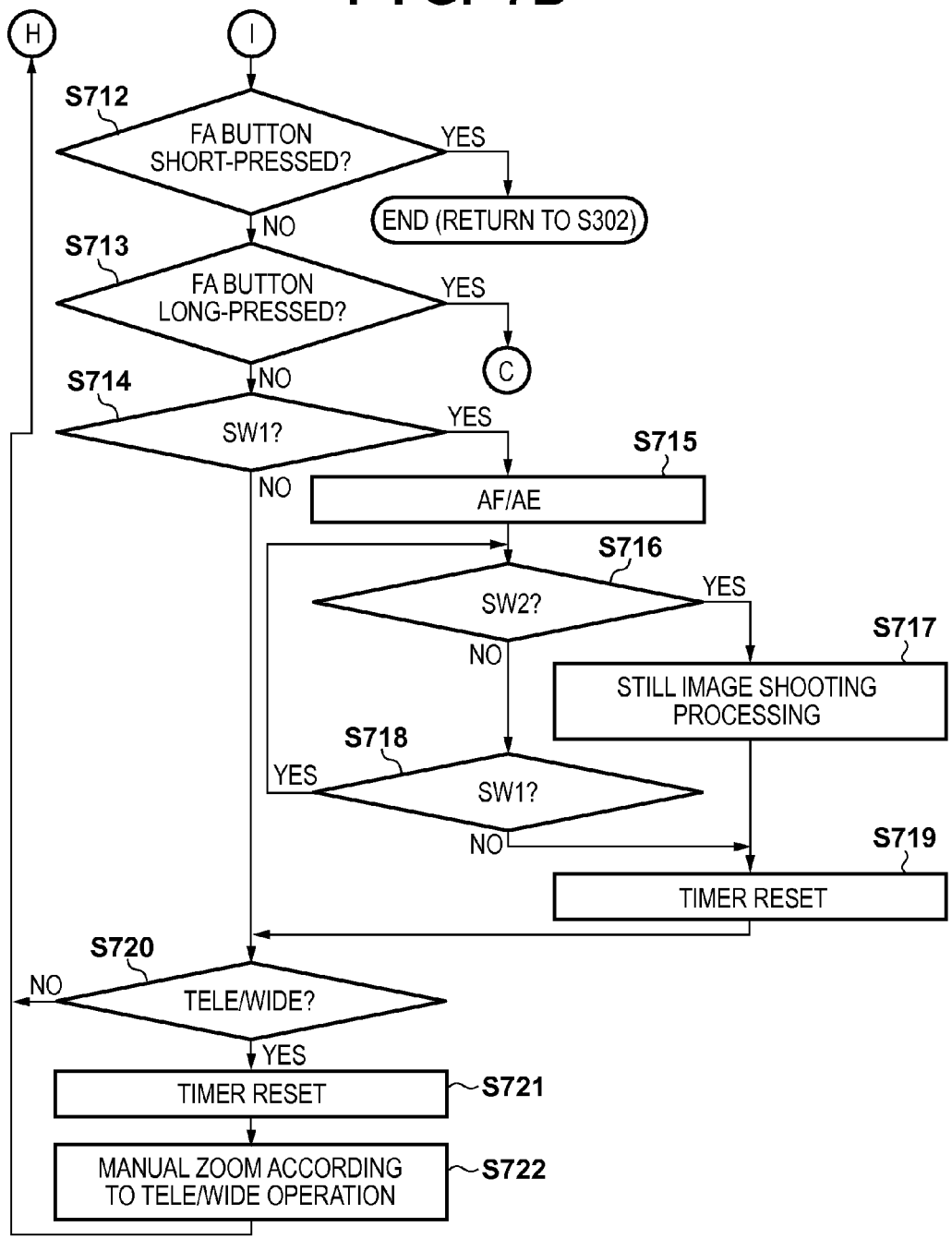

IMAGE CAPTURING APPARATUS, CONTROL APPARATUS AND CONTROL METHOD FOR CONTROLLING ZOOMING FUNCTION

BACKGROUND OF THE INVENTION

Field of the Invention

The present invention relates to a technique for controlling zooming of an image capturing apparatus.

Description of the Related Art

In recent years, there are more and more electronic devices that are equipped with image capturing apparatuses capable of shooting moving images such as mobile phones, digital cameras and game consoles. These image capturing apparatuses have an optical electronic zooming function or an electronic zooming function using image trimming so that a user can shoot moving images at a desired field angle and magnification.

Such a zooming function is generally realized by manually performing a zooming operation in accordance with a field angle and composition desired by a user, but it is possible that user operation cannot be made in time depending on shooting situations, causing the object to come out of the field angle. Furthermore, for a user who is not familiar with apparatus operations, performing a zooming operation itself is difficult and it is possible that an appropriate operation cannot be performed. Therefore, there is a possibility that a user misses a shooting opportunity at an appropriate field angle.

In light of these backgrounds, Japanese Patent Laid-Open No. 2008-211485 discloses an automatic zooming function that allows a user to select the size of an object to be fitted within a screen in advance on a menu screen and automatically adjusts the size of an object to a preset zoom magnification when shifting to a live view screen. Further, Japanese Patent Laid-Open No. 2013-074454 also discloses an automatic zooming function for automatically adjusting zooming, by selecting one or more person as objects in a live view image, so that all the selected objects fit within a field angle.

The automatic zooming function, with which an image capturing apparatus can automatically perform zooming and adjust composition to be appropriate in this manner, is important especially in terms of preventing a shooting opportunity from being missed.

However, because in the above Japanese Patent Laid-Open No. 2008-211485, a user cannot set the size of an object while checking composition in a live view image, the user cannot grasp the impression given from an actual image. Furthermore, even if the size of an object is selected in a menu screen, a shooting opportunity may be missed unless zooming is started immediately. Furthermore, in the above Japanese Patent Laid-Open No. 2013-074454, a user cannot set the size of an object according to which the object is to fit within a field angle.

SUMMARY OF THE INVENTION

The present invention has been made in consideration of the aforementioned problems, and realizes an image capturing apparatus that enables shooting with an appropriate composition by making it possible to set object size while viewing a live view image.

In order to solve the aforementioned problems, the present invention provides an image capturing apparatus comprising: an image capturing unit configured to capture an image; a display unit configured to display an image captured by the image capturing unit; a detection unit configured to detect an object from an image captured by the image capturing unit; a first operation unit configured to be capable of accepting an operation for changing a size of an object while a captured image is displayed on the display unit; a setting unit configured not to change a set object size even when the first operation unit is operated while a moving image is being recorded and the captured image is being displayed on the display unit, and to change a set object size based on an operation on the first operation unit during a moving image recording stand-by or before still image shooting and while the captured image is being displayed on the display unit; and a zooming control unit configured to automatically perform zooming such that an object fits within a screen according to a size set by the setting unit.

In order to solve the aforementioned problems, the present invention provides a control apparatus comprising: a communication unit configured to be capable of communicating with an image capturing apparatus; a control unit configured to control an operation of the image capturing apparatus via the communication unit; a display unit configured to display an image received from the image capturing apparatus via the communication unit; a first operation unit configured to be capable of accepting an operation for changing a size of an object while the image is being displayed on the display unit; and a setting unit configured not to change a set object size even when the first operation unit is operated while a moving image is being recorded and the captured image is being displayed on the display unit, and to change a set object size based on an operation on the first operation unit during a moving image recording stand-by or before still image shooting and while the captured image is being displayed on the display unit, wherein the control unit controls the image capturing apparatus to automatically perform zooming so that an object fits within a screen in accordance with a size set by the setting unit.

In order to solve the aforementioned problems, the present invention provides a control method of an image capturing apparatus that includes an image capturing unit for capturing an image, a display unit for displaying an image captured by the image capturing unit, a first operation unit, the method comprising: detecting an object from an image captured by the image capturing unit; not changing a set size of an object even when the first operation unit is operated while a moving image is being recorded and the captured image is being displayed on the display unit, and changing a set size of an object based on an operation on the first operation unit during a moving image recording stand-by or before still image shooting and while the captured image is being displayed on the display unit; and automatically performing zooming such that an object fits within a screen according to the set size.

In order to solve the aforementioned problems, the present invention provides a control method of a control apparatus that includes a communication unit communicable with an image capturing apparatus and controls an operation of the image capturing apparatus via the communication unit, the method comprising: displaying an image received from the image capturing apparatus via the communication unit; not changing a set object size even when a first operation unit is operated while a moving image is being recorded and the captured image is being displayed on a display unit, and changing a set object size based on an operation on the first operation unit during a moving image recording stand-by or before still image shooting and while the captured image is being displayed on the display unit;

and controlling the image capturing apparatus to automatically perform zooming such that an object fits within a screen according to the set size.

According to the present invention, it is possible to realize an image capturing apparatus that enables shooting with an appropriate composition by making it possible to set object size while viewing a live view image.

Further features of the present invention will become apparent from the following description of exemplary embodiments (with reference to the attached drawings).

BRIEF DESCRIPTION OF THE DRAWINGS

FIGS. 7A and 7B are flowcharts showing manual zooming processing during FA automatic of FIGS. 5A and 5B.

DESCRIPTION OF THE EMBODIMENTS

Embodiments in which an image capturing apparatus according to the present invention is applied to a digital camera that is provided with an automatic zooming function and capable of shooting still images and moving images will be described below in detail with reference to accompanied drawings.

Here, a framing assist function as an automatic zooming function according to the present embodiment will be outlined.

Framing assist (hereinafter, which may be abbreviated as FA) function is a function for automatically controlling optical zoom or electronic zoom such that the ratio of sizes of objects in a screen is maintained substantially constant.

Additionally, the framing assist function according to the present embodiment includes following characteristic zooming control functions.

One zooming control function is a framing assist automatic function (hereinafter, FA automatic). FA automatic includes (1) an automatic zooming function for detecting an object (face) from a captured image and automatically controlling zoom magnification such that the proportion of the object to the field angle corresponds to a designated size, and (2) a search assist function for zooming out automatically upon detecting that the camera has moved.

Another zooming control function is a temporarily-zooming-out function. The temporarily-zooming-out function is a function in which zoom magnification is set on the TELE side, and, in the case where a user loses sight of an object, for example, the zoom magnification is temporarily changed to be on the WIDE side when a user holds down a dedicated framing assist button (hereinafter, FA button) for or beyond a certain time period. This makes it easy for the user to search for the lost object. Furthermore, in the case where the object is found, when the user sets the object so as to fit within the frame displayed in the center of the screen and the FA button is released, the zoom magnification is automatically changed to the original magnification on the TELE side. Because the FA button is an operation member for performing zooming operation, the button is arranged on the periphery of a lens barrel where there is a zoom lens in order to provide an intuitive operational feeling.

Apparatus Configuration

The configuration and functions of a digital camera according to the present embodiment will be described below with reference to FIGS. 1A, 1B and 2.

Figure 1A:
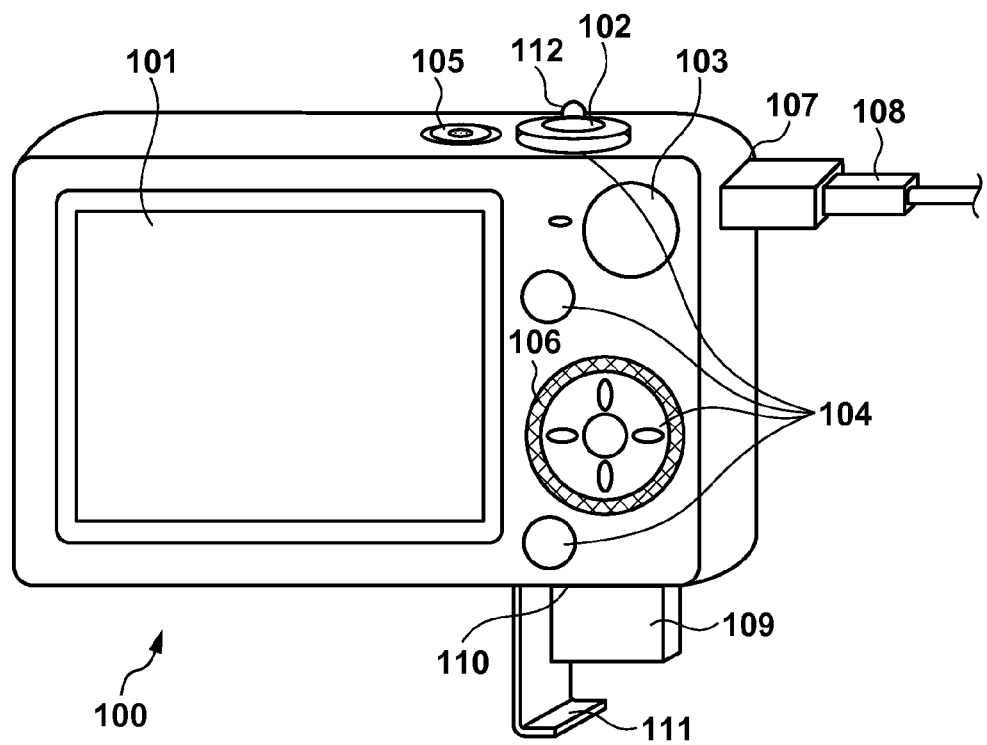
FIG. 1A is a diagram showing an appearance of the back of an image capturing apparatus according to a present embodiment.
Figure 1B:
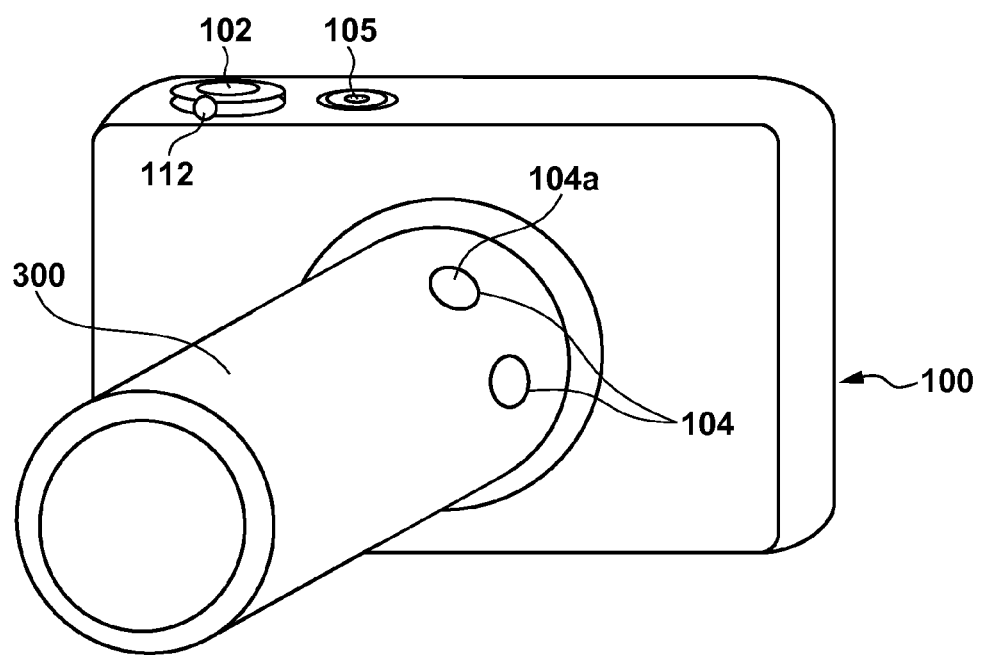
FIG. 1B is a diagram showing an appearance of the front of an image capturing apparatus according to the present embodiment.

In FIGS. 1A and 1B which show an external appearance of a digital camera 100 according to the present embodiment, a display unit 101 displays images and various information. A shutter button 102 is an operation unit for shooting. A mode switching button 103 is an operation unit for changing over among various modes. A connector 107 is an interface that connects a connection cable 108 with a digital camera 100. Operation units 104 comprise operation members such as various switches, buttons and a touch panel operated in various ways by the user. A controller wheel 106 is a rotatable electronic dial included among the operation units 104. A power switch 105 switches between power on and power off. A recording medium 109 is a medium such as a memory card or hard disk. A recording medium slot 110 is for accommodating the recording medium 109. The recording medium 109 accommodated in the recording medium slot 110 makes it possible to communicate with the digital camera 100. A cover 111 covers the recording medium slot 110. A zoom lever 112 is a zoom instruction member movable right and left, which is used for a user to instruct a zoom operation of a photographing lens 203, and can drive the photographing lens 203 to be on the TELE side if moved in one direction and to be on the WIDE side if moved in the other direction. Note that four-direction (up, down, left, right) buttons or the like can be assigned as zoom buttons.

The operation units 104 may also be disposed at the front side of the digital camera 100 as shown in FIG. 1B. An FA button 104a included among the operation units 104 is an operation unit for instructing the operations of the above-described FA automatic or the temporarily-zooming-out function. The FA button 104a is arranged at a side portion of a lens barrel 300 on the front side of the digital camera 100 as shown in FIG. 1B, and the user can operate the button while holding the lens barrel 300 with his/her hand during shooting (without removing the hand from the lens barrel 300). When the FA button 104a is long-pressed, zoom magnification is temporarily changed to be on the WIDE side by the temporarily-zooming-out function, making it possible to promptly search for the lost object, and when the FA button 104a is released, the zoom magnification returns to the immediately preceding zoom magnification, making it possible to promptly return to shooting. Further, when the FA button 104a is short-pressed, a tracking frame is displayed on the face of an object, the zoom magnification is automatically changed such that the size of the face of the object within the screen reaches a preset target size, and when the FA button 104*a* is short-pressed again, the zoom magnification returns to the immediately preceding zoom magnification.

Figure 2:
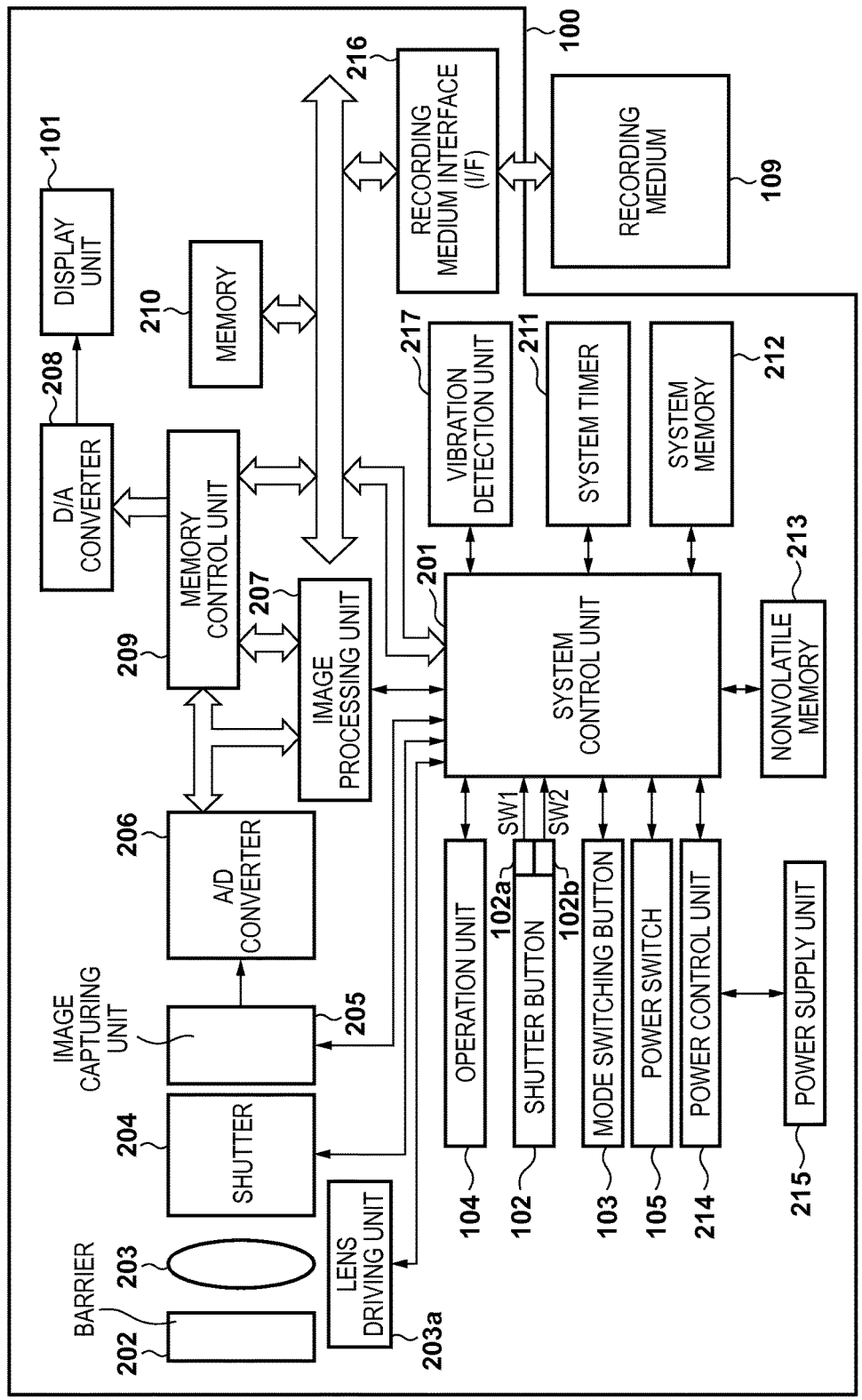
FIG. 2 is a block diagram showing an image capturing apparatus according to the present embodiment.

In FIG. 2 which shows an internal configuration of a digital camera 100 according to the present embodiment, a photographing lens 203 includes a zoom lens and a focusing lens. A shutter 204 has a diaphragm function. An image capturing unit 205 is an image sensor, which is constituted by a CCD or CMOS or the like, for converting the optical image of an object to an electric signal. An A/D converter 206 converts an analog signal to a digital signal. The A/D converter 206 is used to convert an analog signal, which is output from the image capturing unit 205, to a digital signal. A barrier 202 covers the image capturing system (which includes the photographing lens 203) of the digital camera 100, thereby preventing contamination of and damage to the image capturing system that includes the photographing lens 203, shutter 204 and image capturing unit 205.

A lens driving unit 203*a* has a DC motor or an ultrasonic motor, for example, and drives a focusing lens to move to a focal position based on a control signal from a system control unit 201. Further, the lens driving unit 203*a* also drives a zoom lens to move to a zoom position based on a control signal from the system control unit 201.

An image processing unit 207 performs resizing processing, such as predetermined pixel interpolation and reduction, and color conversion processing, with respect to data from the A/D converter 206 or data from a memory control unit 209. Further, the image processing unit 207 performs predetermined calculation processing using the captured image data, and the system control unit 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 207 performs predetermined calculation processing using the captured image data, and AWB (Automatic White Balance) processing of TTL type is performed on the basis of the calculation results.

The data from the A/D converter 206 is directly written into a memory 210 via both the image processing unit 207 and the memory control unit 209 or via the memory control unit 209. The memory 210 stores the image data obtained from the image capturing unit 205 and the A/D converter 206, and image display data to be displayed on the display unit 101. The memory 210 has a storage capacity that is sufficient for storing a predetermined number of still images as well as moving images and audio for a predetermined time period.

The memory 210 also functions as a memory for image display (video memory). A D/A converter 208 converts the image display data stored in the memory 210 into an analog signal and supplies the display unit 101 with the analog signal. The image display data that was written into the memory 210 is displayed by the display unit 101 via the D/A converter 208. The display unit 101 performs, on a display device such as an LCD, display in accordance with the analog signal from the D/A converter 208. A predetermined signal processing of the analog signal once converted by the A/D converter 206 and stored in the memory 210 is performed by the image processing unit 207 and then stored in the memory 210. In this manner, the digital signals stored in the memory 210 are converted into analog signals, and the analog signals are successively transmitted to the display unit 101 so as to be displayed thereon, making it possible to realize an electronic view finder (EVF) functionality and to perform live view image (also called through image).

A nonvolatile memory 213 is, for example, an EEPROM, which is electrically erasable and recordable. In the nonvolatile memory 213, constants and programs, for example, for operating the system control unit 201 are stored. In this context, "programs" may refer to programs for executing various flowcharts that will be described later.

The system control unit 201 is a calculation processing device for overall controlling the entire camera 100, and realizes, by executing the programs stored in the nonvolatile memory 213, the processing procedures of the flowchart that will be described later. The system memory 212 is, for example, a RAM and used also as a work memory where constants and variables for operating the system control unit 201, and the programs read out from the nonvolatile memory 213 are expanded. The system control unit 201 controls the memory 210, the D/A converter 208, the display unit 101, and the like, so as to perform display control.

A system timer 211 is a timer circuit for measuring time periods for various types of controls and the time of an integrated clock.

A mode switching button 103, a first shutter switch 102*a*, a second shutter switch 102*b*, and the operation units 104 are operation members for inputting various types of instructions into the system control unit 201.

The mode switching button 103 switches the operation mode of the system control unit 201 to any one of a still image shooting mode, a moving image recording mode, and a reproduction mode. The still image shooting mode includes an automatic shooting mode, an automatic scene determination mode, a manual mode, scene-specific shooting modes, a program AE mode, a custom mode, and the like. Using the mode switching button 103, the mode is directly switched to any one of the plurality of modes included in the still image shooting mode. Alternatively, it is also possible to switch, using the mode switching button 103, to the still image shooting mode and then to switch, using another operation member, to any one of the plurality of modes included in the still image shooting mode. Similarly, also the moving image recording mode may include a plurality of modes.

While the shutter button 102 provided on the camera 100 is being operated, that is, pressed half-way (the shooting preparation instruction), the first shutter switch 102*a* is turned on and generates a first shutter switch signal SW1. Upon receiving the first shutter switch signal SW1, the system control unit 201 causes the image processing unit 207 to start the AF (Automatic Focus) processing, the AE (Automatic Exposure) processing, the AWB (Automatic White Balance) processing, the EF (flash pre-emission) processing and the like.

When the operation of the shutter button 102 is completed, that is, the shutter button 102 is pressed fully (the shooting instruction), the second shutter switch 102*b* is turned on and generates a second shutter switch signal SW2. Upon receiving the second shutter switch signal SW2, the system control unit 201 starts a series of shooting processing from reading out the signal from the image capturing unit 205 to writing of image data to the recording medium 109.

By selecting various functional icons displayed on the display unit 101, appropriate functions for each situation are assigned to the operation units 104, and the operation units 104 thus act as various function buttons. Examples of these function buttons include an end button, a back button, an image scrolling button, a jump button, a narrow-down button, an attribute change button. For example, a notification for a menu switching instruction is given and a menu screen that enables various settings to be made is displayed on the display unit 101 by pressing a menu button. The user can make various settings intuitively by using the menu screen, which is displayed on the display unit 101, four-direction (up, down, left, right) buttons and a SET button.

Included among the operation units 104 is also a touch panel as a touch detecting unit capable of detecting a touch operation on the display unit 101. The touch panel and the display unit 101 can be constructed as a single integrated unit. For example, the touch panel is constructed in such a manner that the transmittance of light will not interfere with the display presented by the display unit 101, and it is attached to the uppermost layer of the display face of the display unit 101. In addition, input coordinates on the touch panel and display coordinates on the display unit 101 are correlated. As a result, a GUI can be constructed that makes it possible for the user to directly manipulate the screen displayed on the display unit 101.

The controller wheel 106, which is a rotatable operation member included among the operation units 104, is used together with the direction buttons as when a selection item is specified. When the controller wheel 106 is turned, an electrical pulse signal is generated in accordance with the amount of rotation, and the system control unit 201 controls each unit of the digital camera 100 based upon the pulse signal. The angle through which the controller wheel 106 has been turned and how many times it has been turned can be determined by the pulse signal. It should be noted that the controller wheel 106 can be any operating member so long as it is an operating member whose rotation can be detected. For example, it can be a dial operating member in which the controller wheel 106 per se is rotated to generate the pulse signal in accordance with a turning operation by the user. Further, it can be a device (a so-called touch wheel) that detects an operation such as the revolution of the user's finger on the controller wheel 106 without by controller wheel 106 itself being rotated.

A power control unit 214 is constituted by, for example, a battery detection circuit, a DC-DC converter, a switch circuit for changing over the block to be supplied with power, and detects a battery has been inserted or not, the type of the battery, and the residual capacity thereof. Further, the power control unit 214 controls the DC-DC converter in accordance with the detection results and an instruction of the system control unit 201, and supplies a necessary voltage for a necessary length of time to each of the units including the recording medium 109.

A power supply unit 215 comprises a primary battery such as an alkaline battery or a lithium battery, a secondary battery such as an NiCd battery, an NiMH battery, or an Li-ion battery, or an AC adaptor. The recording medium interface (I/F) 216 is for interfacing with the recording medium 109 which may be a memory card or hard disk. The recording medium 109 is a recording medium such as a memory card for recording shot images, and constituted by a semiconductor memory, a magnetic disk, or the like.

A vibration detection unit 217 is comprised of an acceleration sensor or gyro sensor and the like and detects the vibration added to the digital camera 100. Based on the detected vibration, it is possible to discriminate whether the digital camera 100 is panned or tilted.

The digital camera 100 of this embodiment can perform shooting using an automatic focus technique, such as single center point AF or face AF. "Single center point AF" refers to AF on a single central position on a shooting screen. "Face AF" refers to AF on a face on a shooting screen that was detected using a face detection function.

Hereinafter, the face detection function will be described.

The system control unit 201 reads out image data (including a through image) stored in the memory 210, and detects edge elements via bandpass filters in the horizontal direction and the vertical direction. Then, the system control unit 201 performs pattern matching of the detected edge elements, and extracts candidate groups of eyes, noses, mouths, and ears. Furthermore, from among the candidate groups of eyes extracted by pattern matching, the system control unit 201 determines eyes that satisfy a preset condition (for example, a distance between two eyes, the inclination thereof, or the like) as a pair of eyes, and narrows down to pairs of eyes as the candidate groups of eyes. Then, the system control unit 201 correlates the narrowed down candidate group of eyes with the corresponding other parts (nose, mouth, and ear) constituting the face, or detects a face via a preset non-face condition filter to generate feature information on the face according to the detection result, and stores the information in a system memory 212. Note that, in order to notify the user of the detected face, it is also possible to perform display on the display unit 101 while superimposing a face frame or the like on the image depending on the coordinates of the face position or size of the face, for example.

By analyzing the image data that is displayed in Live-view or playback-view in the above-described manner, it is possible to extract feature information on an object in an image. According to the present embodiment, face information is taken as an example of feature information on an object, but there are various other types of information on red-eye determination, eye detection, shut-eye detection, smile face detection or the like.

Note that it is possible to perform face AE, face FE, face WB at the same time with face AF. The face AE is a technique for optimizing the exposure of the entire screen according to the brightness of the detected face. The face FE is a technique for modulating flash light with a focus on the detected face. The face WB is a technique for optimizing the white balance of the entire screen according to the color of the detected face.

Note that the hardware configuration is not limited to that shown in FIG. 2, and a configuration is also possible in which, for example, a single item of hardware performs display control, communication control, recording control, image processing control, and the like, so as to function as each unit or block of the digital camera 100. Alternatively, it is also possible that a plurality of items of hardware operate in cooperation with each other to function as a single unit or block.

The digital camera 100 can be used by switching between at least a reproduction mode used to reproduce an image and a shooting mode used to shoot an image. The shooting mode includes an auto mode, manual mode, a creative shot mode and a plurality of scene-specific shooting modes. The auto mode is a mode in which a program installed in the digital camera 100 automatically determines various parameters of the camera based on a measured exposure value. The manual mode is a mode in which the user can freely change various parameters of the camera. The creative shot mode is a mode in which the camera automatically identifies a situation, and the shot image automatically undergoes image processing (filter processing) such as "composition", "color/light", "blurring taste" so as to generate multiple types of images (including the original image). In the creative shot mode, for example, three instances of shooting are performed with one instruction, and, in addition to one original image, five images that are different in "composition", "color/light" and "blurring taste" are generated. The scene-specific shooting mode (SCN) is a shooting mode implemented for each shooting scene by combining a shutter speed, f-number, the status of flash emission, sensitivity setting, white balance (WB) setting, and the like which are suitable for the shooting scene. The digital camera 100 includes the following scene-specific shooting modes (1) to (20). Note that the scene-specific shooting modes are not limited to these.

(1) Water shooting mode (beach mode): a mode capable of performing shooting without darkening a person or the like even on the sea or a sandy beach with strong sunlight reflection.

(2) Nightscape shooting mode: a mode specialized in a nightscape scene to emit flash light to a person and record the background at a low shutter speed.

(3) Skyrocket shooting mode: a mode to vividly shoot skyrocket at an optimum exposure.

(4) Underwater shooting mode: a mode to set a white balance optimum for underwater shooting and perform shooting while suppressing tinges of blue.

(5) Sunset shooting mode: a mode to perform shooting by emphasizing a silhouette and red.

(6) Portrait shooting mode: a mode specialized in shooting a person by blurring the background so that the person stands out.

(7) Sports shooting mode: a shooting mode to make settings specialized in shooting a quickly moving object.

(8) Snow shooting mode: a mode to perform shooting without darkening a person even in a snow scene and leaving tinges of blue.

(9) Night & snap shooting mode: a mode suited to clear shooting of a nightscape and person without using a tripod.

(10) Spotlight shooting mode: a mode to clearly shoot an object under a spotlight.

(11) Aquarium mode: a mode to set sensitivity, white balance and tinges of colors suitable for shooting fish in a water tank in building or the like.

(12) Still object shooting mode: a mode to set to a macro mode and to a rather high level of contrast.

(13) Flower shooting mode: a mode to set to a macro mode and to set saturation to a rather high level.

(14) Food shooting mode: a mode to set to a macro mode, to set saturation to a rather high level and to set non-flash emission.

(15) Self-shooting mode: a mode that involves parameter settings specialized for person shooting in a similar manner as portrait shooting and the like, and also includes an interface that makes it easy for a photographer to shoot himself as an object.

(16) Starry sky snap mode: a mode to shoot the starry sky and a person together.

(17) Star Nightscape mode: a mode capable of readily shooting the starry sky.

(18) Star trail mode: a mode to record star trails according to the diurnal motion by compositing images obtained by long-exposure shooting in the respective shooting operations of interval shooting.

(19) Starry sky interval moving image mode: a mode to generate a fast-forwarding moving image by forming a moving image file from still images shot at a predetermined interval.

The photographer can perform shooting by setting the digital camera 100 to a desired shooting mode from a shooting mode selection menu.

Shooting Mode Processing

Next, shooting mode processing performed by a digital camera according to the present embodiment will be described with reference to FIGS. 3A and 3B.

Figure 3A:
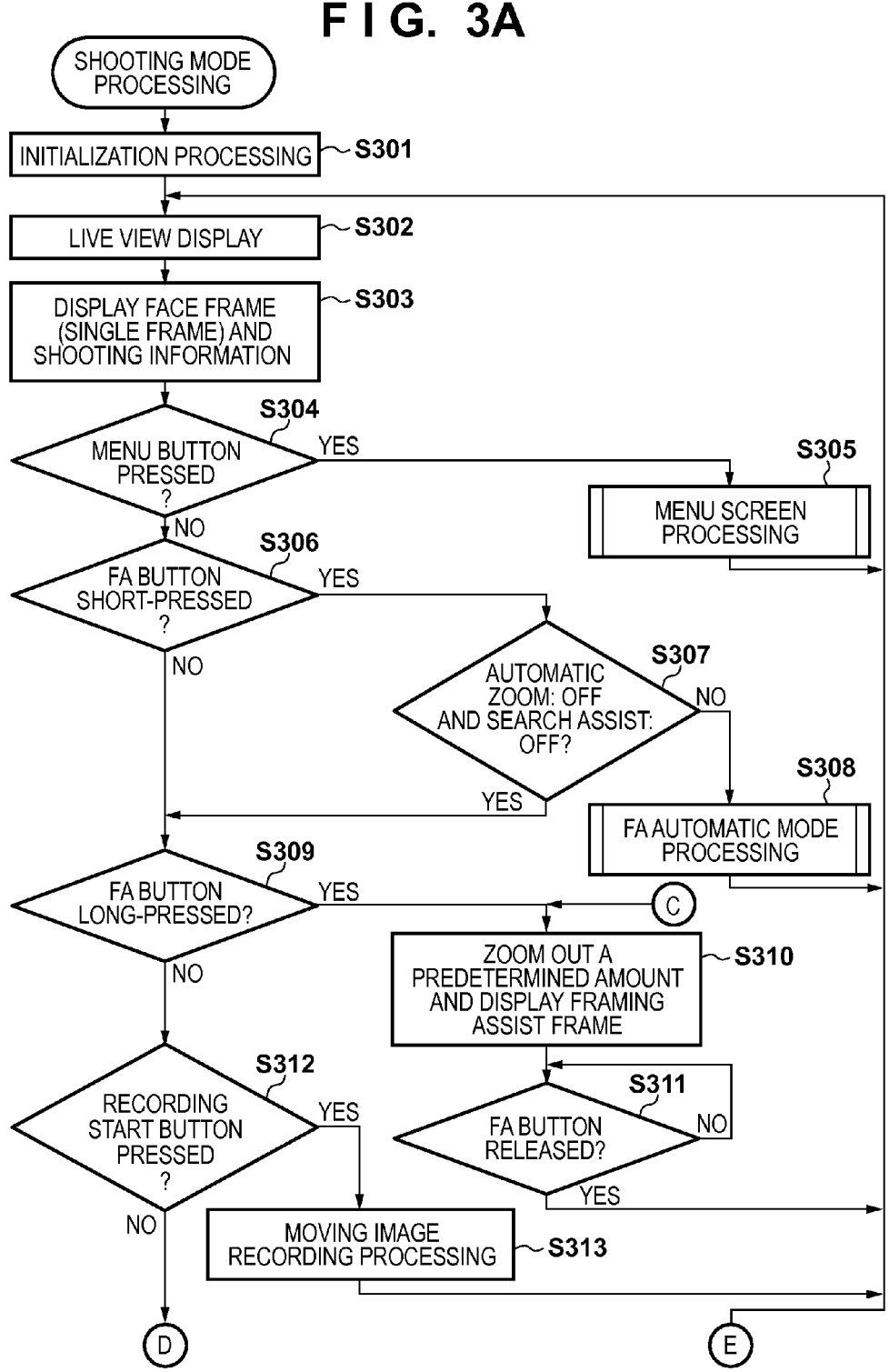
FIGS. 3A and 3B are flowcharts showing shooting mode processing of an image capturing apparatus according to the present embodiment.
Figure 3B:
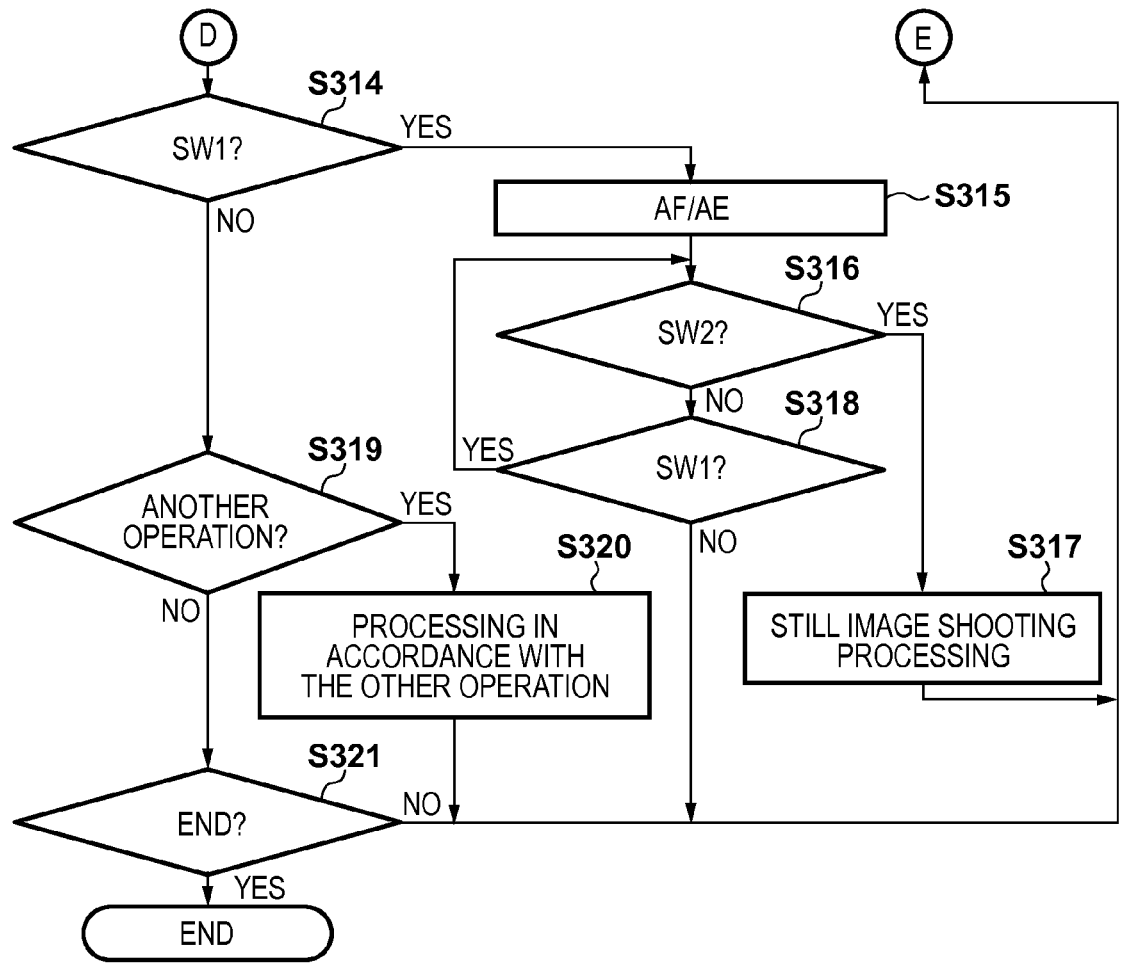

Note that processing in FIGS. 3A and 3B are realized by the program recorded in the nonvolatile memory 213 being read out into the system memory 212 and executed by the system control unit 201.

In step S301, the system control unit 201 performs initialization of a flag, control variables or the like as initialization processing for starting a shooting mode.

In step S302, the system control unit 201 displays the live view image captured by the image capturing unit 205 on the display unit 101.

In step S303, the system control unit 201 displays, on the display unit 101, an AF frame based on an AF technique, other shooting parameters, OSD or the like superimposed on a live view image.

Figure 9A:
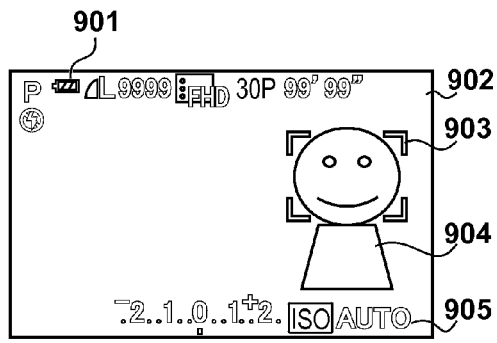
FIGS. 9A-9F are diagrams illustrating display screens in shooting mode processing according to the present embodiment.

FIG. 9A illustrates a live view screen in which face AF is used as an AF method. In FIG. 9A, on the display unit 101, as OSD (display item), icons 901 indicating a current shooting mode, remaining battery level, possible number or duration of shooting images or the like are superimposed on a live view image 902 and are displayed on the upper portion of the screen, and icons 905 indicating shooting parameters or the like are displayed at the lower portion of the screen. In the case where an object is detected in a face AF mode, a single face frame 903 is displayed around the face of an object 904.

In step S304, the system control unit 201 determines whether or not a menu button included among the operation units 104 has been pressed. If the button has been pressed, the process proceeds to S305, and in the case where the button has not been pressed, the process proceeds to S306.

In step S305, the system control unit 201 performs menu screen processing. The details of menu screen processing will be described later with reference to FIG. 4. When menu screen processing ends, the process returns to S302.

In step S306, the system control unit 201 determines whether or not the FA button 104a included among the operation units 104 has been short-pressed (whether or not the time elapsing between when the button was pressed and when the button was released is less than a predetermined time). As a result of determination, in the case where the FA button 104a has been short-pressed, the process proceeds to S307, and in the case where the button has not been short-pressed, the process proceeds to S309.

Figure 4:
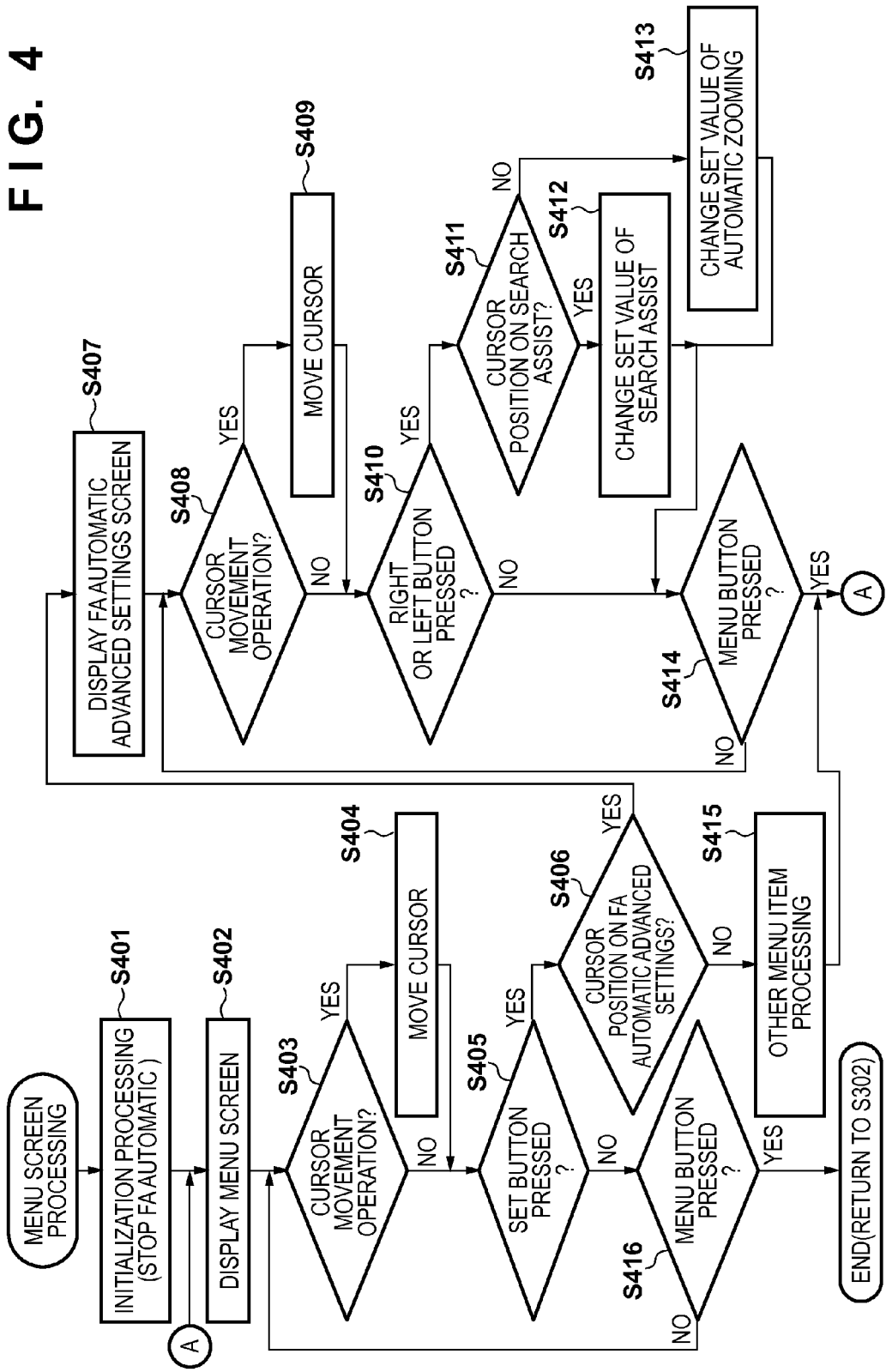
FIG. 4 is a flowchart showing menu screen processing of FIG. 3A.

In step S307, the system control unit 201 determines whether or not set values for automatic zooming and search assist that can be set by menu screen processing described later with reference to FIG. 4 are both "off". As a result of determination, in the case where both are "off", the process proceeds to S309, and otherwise the process proceeds to S308.

In step S308, the system control unit 201 performs FA automatic mode processing. The details of FA automatic mode processing will be described later with reference to FIGS. 5A and 5B. When FA automatic mode processing ends, the process returns to S302.

In step S309, the system control unit 201 determines whether or not the FA button 104a has been long-pressed (whether or not the time elapsing in a state where the button is being pressed is a predetermined time) or more. As a result of determination, in the case where the FA button 104a has been long-pressed, the process proceeds to S310, and in the case where the button has not been long-pressed, the process proceeds to S312.

In step S310, the system control unit 201 controls the photographing lens 203 to perform a predetermined amount of zooming-out (temporarily-zooming-out function). The system control unit 201 also displays, on the display unit 101, a FA frame indicating the area corresponding to the zoom magnification that was used before performing zooming-out in S310.

In step S311, the system control unit 201 continues zooming-out in S310 and display of the FA frame until the FA button 104a pressed in S309 is released, and then, when the FA button 104a is released, performs zooming-in in accordance with the zoom magnification used before performing zooming-out, and the process returns to SS302.

In step S312, the system control unit 201 determines whether or not a recording start button included among the operation units 104 has been pressed. In the case where the button has been pressed, the process proceeds to S313, and in the case where the button has not been pressed, the process proceeds to S314.

In step S313, the system control unit 201 performs moving image recording processing, and when the processing ends, the process returns to S302.

In step S314, the system control unit 201 determines whether or not the shutter button 102 has been pressed half-way and a first shutter switch signal SW1 has been turned on. In the case where the signal is on, the process proceeds to S315, and otherwise the process proceeds to S319.

In step S315, the system control unit 201 performs AF processing and AE processing on image data captured by the image capturing unit 205, and the process proceeds to S316.

In step S316, the system control unit 201 determines whether or not the shutter button 102 has been pressed fully and a second shutter switch signal SW2 has been turned on. In the case where the signal has been turned on, the process proceeds to S317, and otherwise the process proceeds to S318.

In step S317, the system control unit 201 performs a series of shooting processes from reading a signal from the image capturing unit 205 to writing image data into the recording medium 109, and when the processes end, the process returns to S302.

In step S318, the system control unit 201 determines whether or not the shutter button 102 has been pressed half-way and a first shutter switch signal SW1 is turned on. In the case where the signal is still on, the process returns to S316, and in the case where it is not on any more, the process returns to S302.

In step S319, the system control unit 201 determines whether or not another operation has been done. In the case where another operation has been done, the process proceeds to S320, and in the case where other operations have not been done, the process proceeds to S321.

In step S320, the system control unit 201 performs processing in accordance with another operation done in S319. Processing in accordance with another operation includes, for example, processing in which a higher level of camera-shake correction is applied than usual during the operation of an operation member, setting change processing of various types of shooting parameters, processing in which display is switched over in accordance with its orientation in the case where the display unit 101 is of a tilt type and has a movable range and the like.

In step S321, the system control unit 201 determines whether or not an end operation has been performed. In the case where the end operation has been performed, the processing is ended, and otherwise the process returns to S302. "End operation" in this context refers to, for example, a case where a mode has been switched to a reproduction mode using the mode switching button 103, a case where the power has been turned off by the power switch 105, or the like.

Shooting Mode Processing

Next, menu screen processing in S305 of FIG. 3A will be described with reference to FIG. 4.

In step S401, the system control unit 201 performs initialization of a flag, control variables or the like as initialization processing for displaying a menu screen on the display unit 101. Further, the system control unit 201 stops in the case where FA automatic mode processing described later is being performed. Specifically, initialization of a flag, control variables or the like is performed such that FA automatic mode processing is necessarily in an off state when menu screen processing is started.

In step S402, the system control unit 201 displays a first layer of the menu screen on the display unit 101.

Figure 9B:
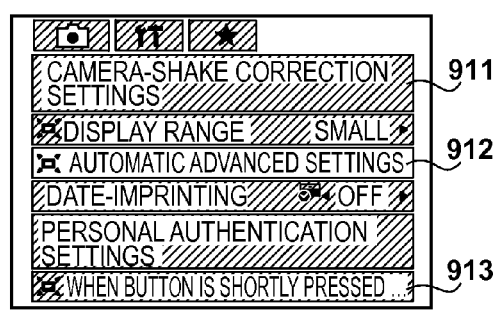

FIG. 9B illustrates a setting screen of the first layer of the menu screen. In FIG. 9B, a menu item 911, a cursor 912, and a guidance 913 for showing explanatory texts for the menu item on which the cursor 912 is positioned are displayed on the display unit 101.

In step S403, the system control unit 201 determines whether or not a cursor movement operation has been performed by four-direction (up, down, left, right) buttons included among the operation units 104. In the case where it has been performed, the process proceeds to S404, and in the case where it has not been performed, the process proceeds to S405.

In step S404, the system control unit 201 changes the position of the cursor 912 displayed on the display unit 101 in accordance with the cursor movement operation in S403.

In step S405, the system control unit 201 determines whether or not a SET button included among the operation units 104 has been pressed. In the case where the button has been pressed, the process proceeds to S406, in the case where the button has not been pressed, the process proceeds to S416.

In step S406, the system control unit 201 determines whether or not the position of the cursor 912 displayed on the display unit 101 is on FA automatic advanced settings. In the case where the position is on the FA automatic advanced settings, the process proceeds to S407, and otherwise the process proceeds to S415.

In step S407, the system control unit 201 displays a second layer of the menu screen (an FA automatic advanced setting screen) on the display unit 101.

Figure 9C:
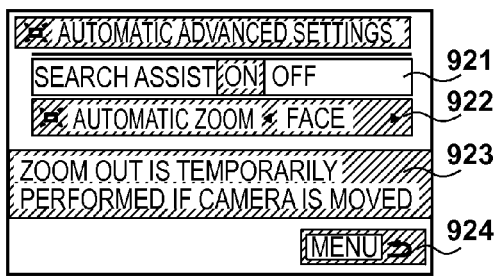

FIG. 9C illustrates the FA automatic advanced setting screen. In FIG. 9C, an search assist item 921 (in this example, color of which is changed because a cursor is positioned on this item), which is one of the menu items, an automatic zooming item 922, a guidance 923 for showing explanatory texts for the menu item where a cursor is positioned, a navigation icon 924 indicating function information to return to the first layer of the menu screen are displayed on the display unit 101.

Steps S408 and S409 are similar to steps S403 and S404.

In step S410, the system control unit 201 determines whether or not right and left buttons included among the operation units 104 have been pressed. In the case where the buttons have been pressed, the process proceeds to S411, and in the case where the buttons have not been pressed, the process proceeds to S414.

In step S411, the system control unit 201 determines whether or not the position of the cursor 912 displayed on the display unit 101 is on the search assist item 921. As a result of determination, in the case where the position is on the search assist item 921, the process proceeds to S412, and otherwise (that is, the position is on an automatic zooming item 922), the process proceeds to S413.

In step S412, the system control unit 201 switches the search assist function described later to either "ON" or "OFF" depending on the right or left button being pressed.

In step S413, the system control unit 201 changes set values of automatic zooming described later in response to the right or left button being pressed. The set values of automatic zooming can be set to, in addition to a set value "OFF" disabling the function itself, "face", "upper half body", "whole body" and "manual" as a target size of an object during the FA automatic mode processing described later. That is, in S413, in response to the right or left button being pressed, the set values of automatic zooming are set to any one of "off", "face", "upper half body", "whole body", and "manual". Note that "face", "upper half body", "whole body", "manual" (that is, other than "off") are all referred to as "ON".

In step S414, the system control unit 201 determines whether or not the menu button included among the operation units 104 has been pressed. In the case where the button has been pressed, the process returns to S402 and the first layer of the menu screen is displayed, and in the case where the button has not been pressed, the process returns to S408.

FA Automatic Mode Processing

Next, FA automatic mode processing in S308 of FIG. 3A will be described with reference to FIGS. 5A and 5B.

In step S501, the system control unit 201 performs initialization processing for performing FA automatic mode processing. Specifically, even in the case where single center point AF is set, switching is made to face AF at the time when processing is shifted to FA automatic mode processing. Further, in the case where among shooting information display displayed on the display unit 101 in step S303 of FIG. 3A, information covering a large portion of the screen (such as a histogram) is displayed, such information is hidden.

In step S502, the system control unit 201 displays, on the display unit 101, an FA automatic mode icon indicating that FA automatic mode processing is being performed.

In step S503, the system control unit 201 determines whether or not the set value of automatic zooming is "ON" (other than "OFF", that is, any one of "face", "upper half body", "whole body", and "manual") in menu screen processing in FIG. 4. As a result of determination, in the case of "ON", the process proceeds to S504, and otherwise the process proceeds to S528.

In step S504, the system control unit 201 displays a target size change dialog of an object on the display unit 101. The set values of this size change dialog change according to the set values of automatic zooming on menu screen processing of FIG. 4, and when the set values on the dialog is changed in a predetermined designation operation described later, set values of automatic zooming are changed as well. However, "OFF" of automatic zooming is selectable only on the menu screen.

In step S505, the system control unit 201 determines whether or not face detection has been done by face AF. In the case where face detection has been done, the process proceeds to S506, and in the case where face detection has not been done, the process proceeds to S525.

In step S506, the system control unit 201 controls the display unit 101 so as to display a tracking frame on the position of the face detected from a live view image based on the detection result in S505.

Figure 9D:
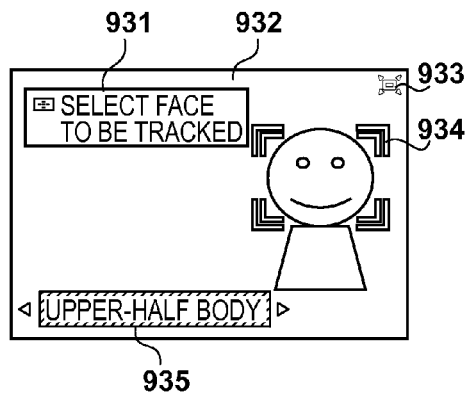

FIG. 9D illustrates a live view screen of a face-tracked state during FA automatic mode processing. In FIG. 9D, as OSD (display item), an FA automatic icon 933 indicating that FA automatic mode processing is being performed is superimposed on a live view 932 and is displayed on the display unit 101. A tracking frame (double face frame) 934 is displayed on the detected face so that it can be seen that the face is in a tracked state, and additionally, in the case where a plurality of faces have been detected, a guidance 931 is displayed which indicates that a user can switch the target face on which the tracking frame 934 (face selecting operation) is displayed by pressing a predetermined button. A target size dialog 935 of an object is further displayed. On this dialog 935, not only the set target size, but also a right and left arrow icon indicating that this can be changed by the right and left buttons are displayed together.

In step S507, the system control unit 201 determines whether or not a predetermined operation has been performed. In the case where the predetermined operation has been performed, the process proceeds to S508, and otherwise the process proceeds to S509. The predetermined operation includes at least a face select operation, the operation of a controller wheel 106, the operation of the right and left buttons, the long-pressing operation of the FA button 104a, the operation of the recording start button, the half-way-pressing operation of the shutter button 102, and pressing of the menu button.

In step S508, the system control unit 201 performs processing corresponding to a predetermined operation of S507. Predetermined operation corresponding processing will be described later in detail with reference to FIG. 6. Note that in the case where a predetermined operation has been performed consecutively in a short time period (for example, 100 msec), processing of S508 is repeated without performing automatic zoom.

In step S509, the system control unit 201 determines whether or not a zoom lever 112 included among the operation units 104 has been operated. In the case where the lever has been operated, the process proceeds to S524, and in the case where the lever has not been operated, the process proceeds to S511.

In step S510, the system control unit 201 performs manual zooming processing during FA automatic. Manual zooming processing during FA automatic will be described later in detail with reference to FIGS. 7A and 7B.

In step S511, the system control unit 201 determines whether or not the size of the object detected in S505 is equal to a target size. In the case where the size of the object is equal to the target size, the process proceeds to S512, and otherwise the process proceeds to S515.

In step S512, the system control unit 201 determines whether or not the face of the object detected in S505 is located in the periphery of a live view image. In the case where the face of the object is located in the periphery of the live view image, the process proceeds to S513, and otherwise the process proceeds to S514.

In step S513, the system control unit 201 temporarily sets, to a target size, a predetermined size (a size for periphery) in the case where the face of an object is located in the periphery. However, target size displayed on the dialog 935 of FIG. 9D does not change.

In step S514, the system control unit 201 changes the target size temporarily replaced by the size for periphery back to the original set values (standard size). Note that it is assumed that the size for periphery is smaller than the standard size. In such a manner, in the case where the detected face moves to the periphery of the screen, the target size is changed to the size for periphery that is smaller than the standard size so that zooming-out is automatically performed to make the face being captured become smaller, making it possible to reduce the possibility that the face of an object comes out of the field angle and is lost.

In step S515, the system control unit 201 determines whether or not the face of the object does not fit in a live view image even if automatic zooming of the photographing lens 203 is started so that the face of the object reaches the target size. In the case where the face of the object fits in the live view image, the process proceeds to S516, and in the case where the face of the object does not, the process proceeds to S524.

In step S516, the system control unit 201 starts automatic zooming of the photographing lens 203.

Step S517 is similar to step S509. In the case where the operation of the zoom lever 112 has been performed, the process proceeds to S518, and otherwise the process proceeds to S519.

In step S518, the system control unit 201 suspends automatic zooming of the photographing lens 203.

Step S519 is similar to step S507. In the case where a predetermined operation is performed, the process proceeds to S522, and otherwise the process proceeds to S520.

In step S520, the system control unit 201 determines whether or not the face of the object has reached the target size, as a result of performing zooming operation on the photographing lens 203. In the case where the face of the object is equal to the target size, the process proceeds to S521, and otherwise the process returns to S517.

In step S521, the system control unit 201 stops automatic zooming of the photographing lens 203.

Steps S522 and S523 are similar to steps S518 and S508.

In step S524, the system control unit 201 determines whether or not the FA button 104a has been short-pressed (whether or not the time period elapsing from when the button was pressed to when the button was released is less than a predetermined time). As a result of determination, in the case where the FA button 104a has been short-pressed, the processing is ended and the process proceeds to S302 of FIG. 3A. In the case where the button has not been short-pressed, the process returns to S505.

Note that in the case where the face was not detected in S505 and the operation moved on to S525, the system control unit 201 determines whether or not search assist is "ON". In the case where the search assist is "ON", the process proceeds to S526, and otherwise the process proceeds to S507.

In step S526, the system control unit 201 determines whether or not the digital camera 100 has been moved based on the vibration detected by the vibration detection unit 217. In the case where the camera has been moved, the process proceeds to S527, and otherwise the process proceeds to S507. Note that the state where the camera has been "moved" envisions a movement made in an attempt to find the object again by quickly moving the digital camera 100 when the user loses sight of the object.

In step S527, the system control unit 201 performs search assist processing. Search assist processing will be described later in detail with reference to FIGS. 8A and 8B. When search assist processing is ended, the process returns to S505.

Step S528 is similar to step S505. In the case where the face has been detected, the process proceeds to S529, and in the case where the face has not been detected, the process proceeds to S530.

In step S529, the system control unit 201 displays a face frame at the position of the detected face in a live view image displayed on the display unit 101.

Figure 9E:
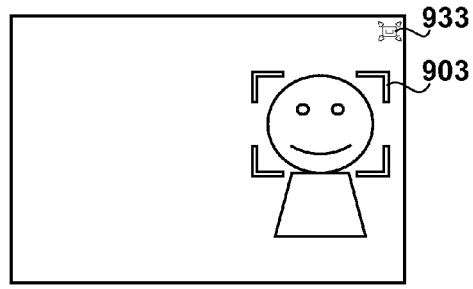

FIG. 9E illustrates a live view screen while FA automatic mode processing in which automatic zooming is set to "OFF" is being performed. In FIG. 9E, as OSD (display item), the FA automatic icon 933 indicating that processing is being performed in the FA automatic mode is superimposed on a live view image and is displayed on the display unit 101. In the case where an object has been detected by the above-described face AF, a single face frame 903 is displayed around the face of the object 904 in the same manner as in FIG. 9A. Note that the target size dialog 935 is not displayed. That is, in the case where a set value of automatic zooming is "OFF", the menu screen has to be opened once in order to change the set value to "ON".

Predetermined Operation Corresponding Processing

Next, predetermined operation corresponding processing in S508 and S523 of FIGS. 5A and 5B will be described with reference to FIG. 6.

Step S601 is similar to step S503. If automatic zooming is other than "OFF", the process proceeds to S602, and otherwise the process proceeds to S607.

In step S602, the system control unit 201 determines whether or not a face select button included among the operation units 104 has been operated. In the case where the button has been operated, the process proceeds to S603, and in the case where the button has not been operated, the process proceeds to S605.

In step S603, the system control unit 201 determines whether or not faces of two or more persons have been detected. In the case where the faces of two or more persons have been detected, the process proceeds to S604, and in the case where the faces of two or more persons have not been detected, the processing is ended.

In step S604, the system control unit 201 switches a face to be tracked.

In step S605, the system control unit 201 determines whether or not the controller wheel 106 or the right or left button has been operated. In the case where the right or left button has been operated, the process proceeds to S606, and in the case where the right or left button has not been operated, the process proceeds to S607.

In step S606, the system control unit 201 changes the target size of the object based on the operation of S605. Accordingly, display of the target size dialog 935 is also updated in such a manner as to indicate the changed target size.

Step S607 is similar to step S309 of FIG. 3A. In the case where the FA button 104a has been long-pressed, the process proceeds to S310 of FIG. 3A, and otherwise the process proceeds to S608.

Step S608 is similar to step S312 of FIG. 3A. In the case where the recording start button has been pressed, the process proceeds to S609, and otherwise the process proceeds to S610.

Step S609 is similar to step S313 of FIG. 3A.

Steps S610 to S614 are similar to steps S314 to S318 of FIG. 3B.

In step S615, the system control unit 201 performs processing in accordance with other operations. As other operations, for example, predetermined operation corresponding processing and FA automatic mode processing are ended by the menu button being pressed, and menu screen processing of FIG. 4 is performed. Furthermore, by a forcible IS button included among the operation units 104 being pressed, predetermined operation corresponding processing and FA automatic mode processing are ended, and forcible IS processing is performed. Forcible IS is a function for applying camera-shake correction of higher level than usual while the button is being pressed, and is useful especially for shooting using telephotography. It is intended that in the forcible IS function, a user mainly defines composition and presses the button at the stage of performing shooting. Accordingly, FA automatic mode processing is ended at the time when the forcible IS button is pressed so that automatic zooming is not performed during forcible IS processing (that is, the process proceeds to S302 of FIG. 3A).

Furthermore, when a function that disables display of a live view image on the display unit 101, such as a function for performing display-off when a predetermined time elapses and a clock screen display operation, is performed, predetermined operation corresponding processing and FA automatic mode processing are ended. This is because, when FA automatic mode processing is performed in the state where a live view video image is not being displayed, there still may be a case where zooming is quickly moved at a timing unintended by a user.

Manual Zooming Processing During FA Automatic

Next, manual zooming processing during FA automatic in S510 of FIG. 5B will be described with reference to FIGS. 7A and 7B.

In step S701, the system control unit 201 starts timer counting.

In step S702, the system control unit 201 performs zooming of the photographing lens 203 in accordance with the operation of the zoom lever 112.

In step S703, the system control unit 201 determines whether or not the timer has ended counting for a predetermined time period. In the case where the predetermined time period has elapsed, the processing is ended, and in the case where the time period has not elapsed, the process proceeds to S704.

Figure 5A:
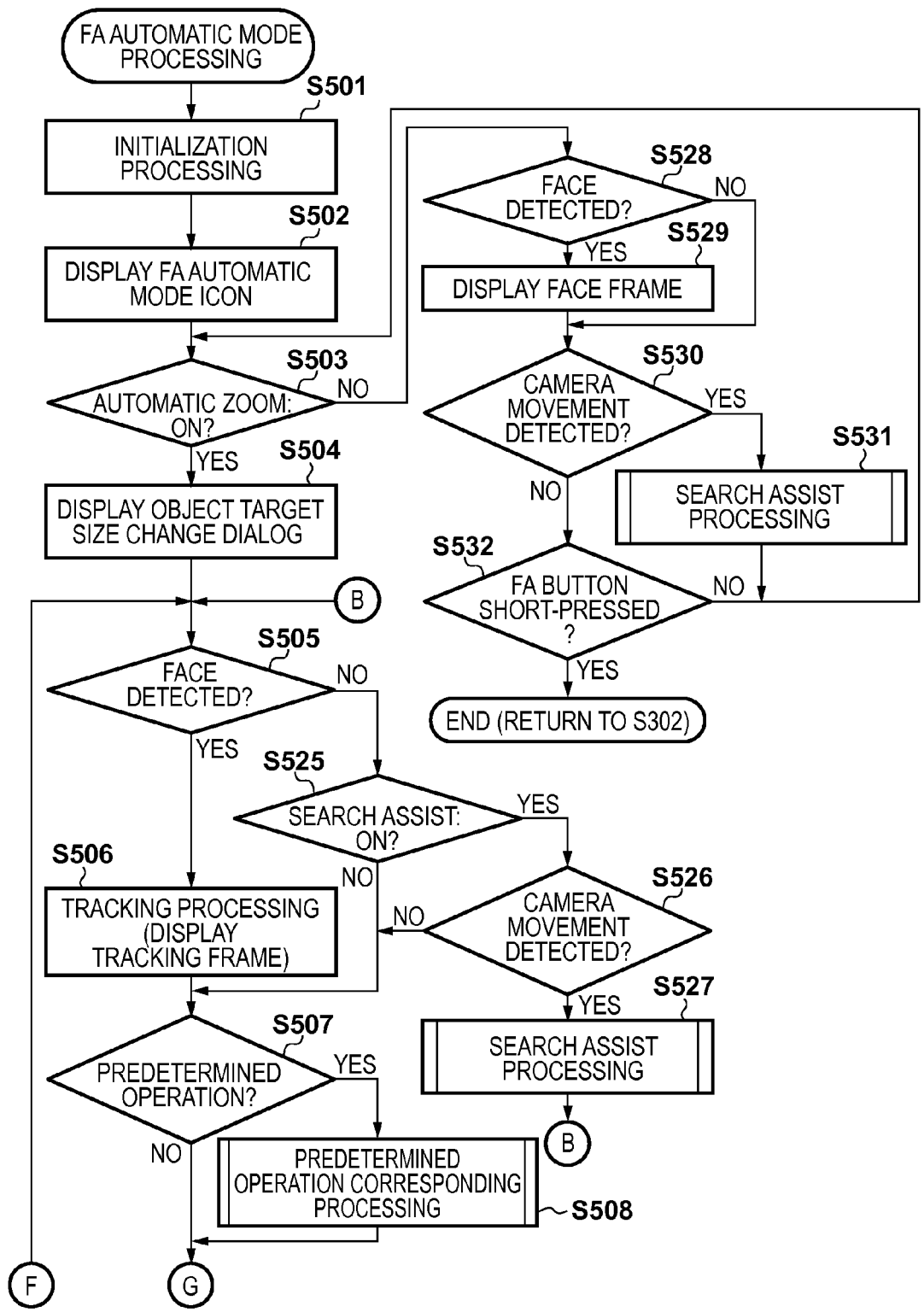
FIGS. 5A and 5B are flowcharts showing FA automatic mode processing of FIG. 3A.

Step S704 is similar to step S503 of FIG. 5A. In the case where automatic zooming is other than "OFF", the process proceeds to S705, and otherwise the process proceeds to S710.

Figure 6:
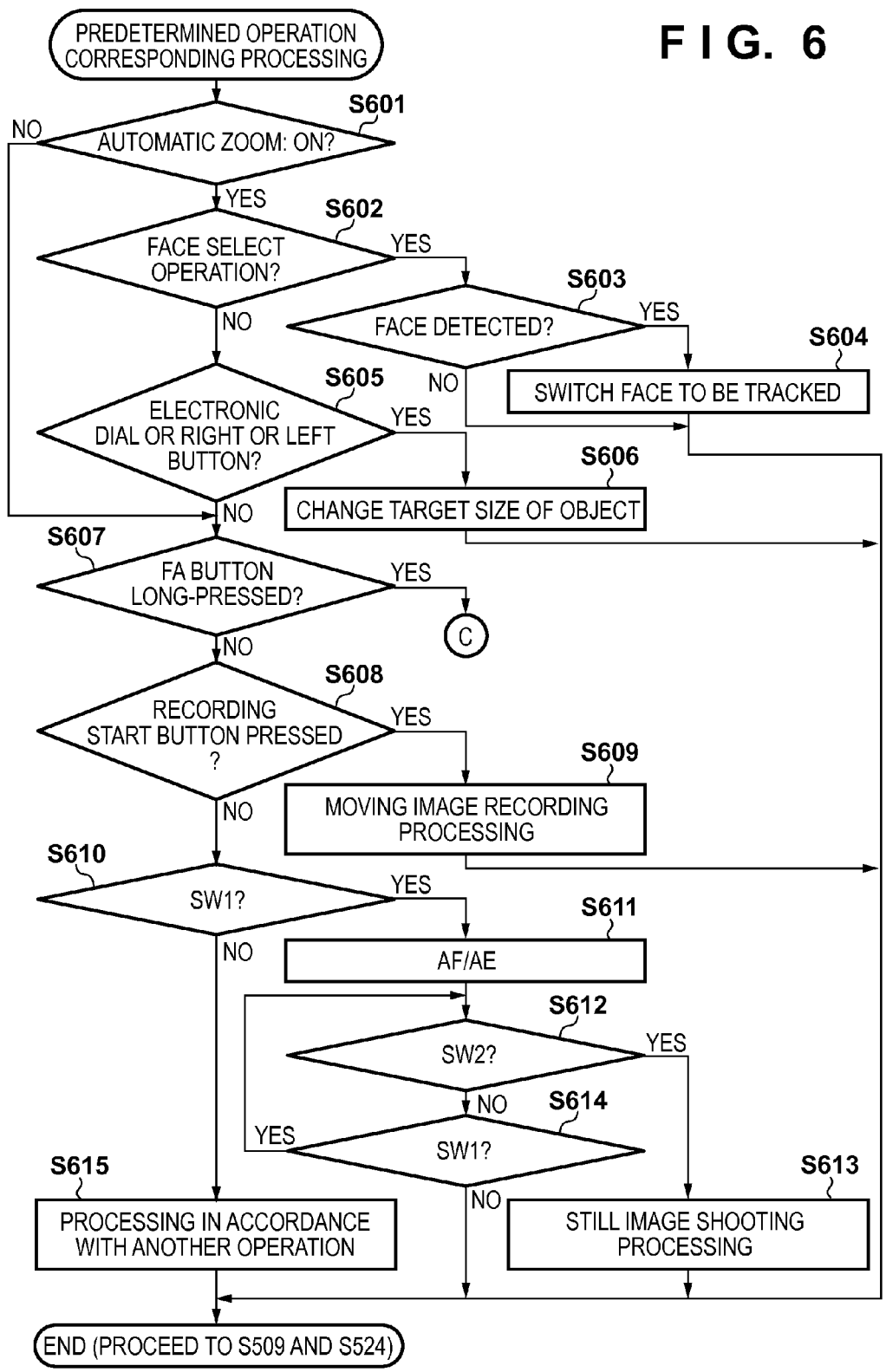
FIG. 6 is a flowchart showing predetermined operation corresponding processing of FIG. 5A.

Steps S705 to S709 are similar to steps S602 to S606 of FIG. 6.

Steps S710 and S711 are similar to steps S608 and S609 of FIG. 6, except that, in S711, when the system control unit 201 starts recording of a moving image, it waits until a predetermined time elapses on the timer that started counting in S701, and then starts automatic zooming-in accordance with the target size.

Step S712 is similar to step S306 of FIG. 3A. In the case where the button has been short-pressed, processing is ended and the process proceeds to S302 of FIG. 3A.

Step S713 is similar to step S309 of FIG. 3A. In the case where the button has been long-pressed, the process proceeds to S310 of FIG. 3A, and otherwise the process proceeds to S714.

Steps S714 to S718 are similar to steps S314 to S318 of FIG. 3B.

In step S719, the system control unit 201 resets the timer that started counting in S701, and starts counting again.

Figure 5B:
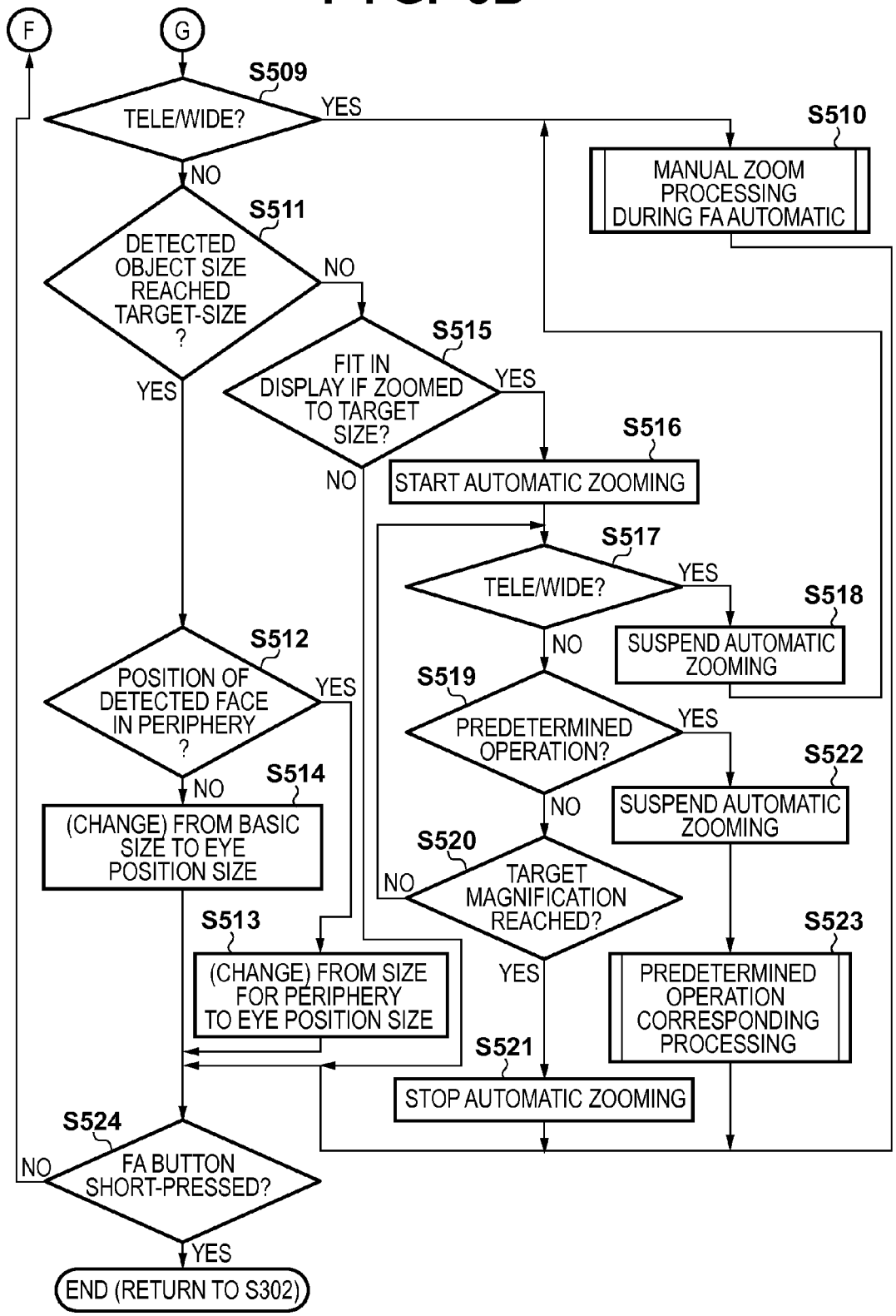

Step S720 is similar to step S509 of FIG. 5B. In the case where a zooming operation has been performed, the process proceeds to S721, and in the case where the zooming operation has not been performed, the process proceeds to S703.

Steps S721 and S722 are similar to steps S719 and S702.

Search Assist Processing

Figure 8A:
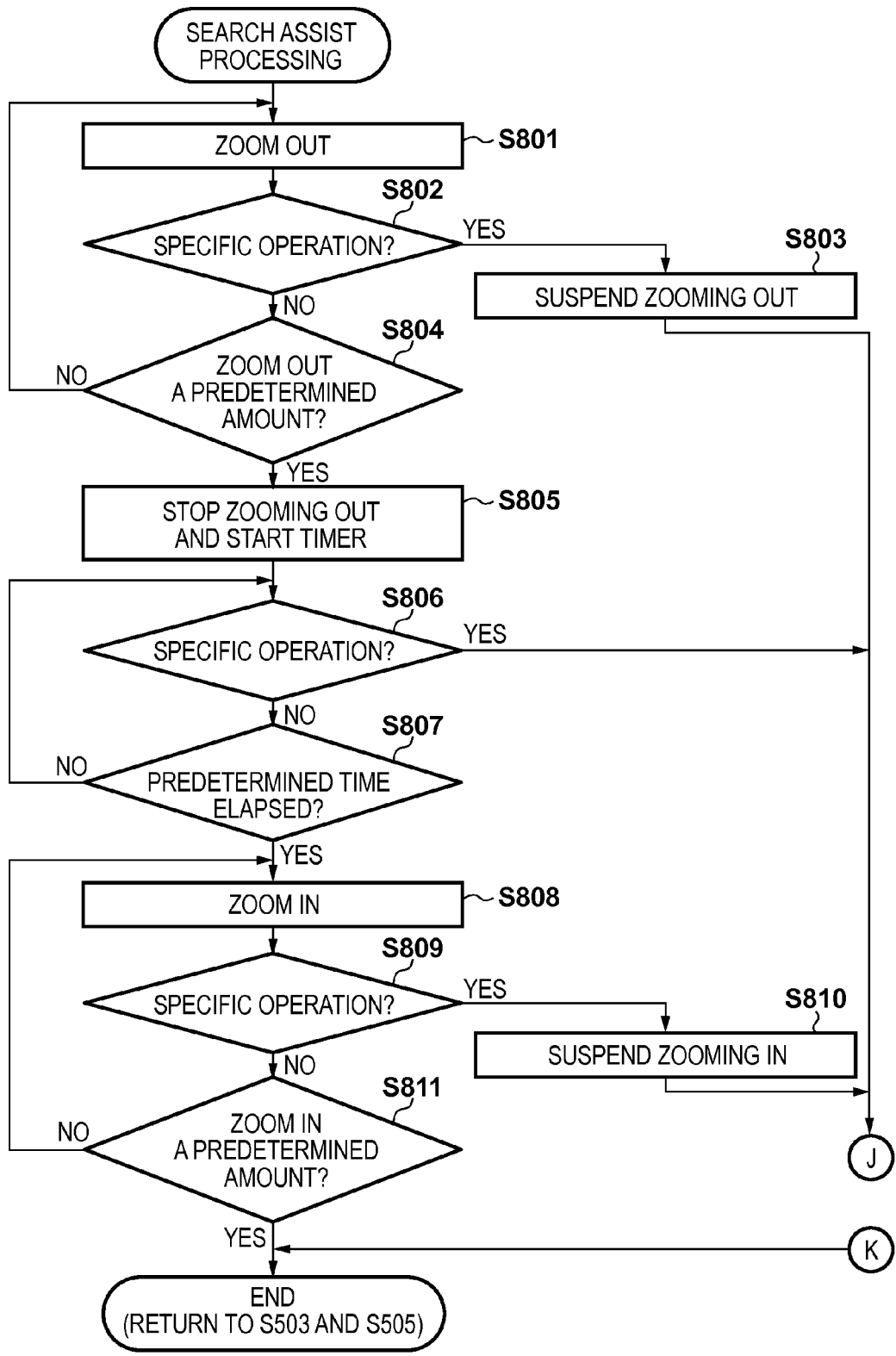
FIGS. 8A and 8B are flowcharts showing search assist processing of FIG. 5A.
Figure 8B:
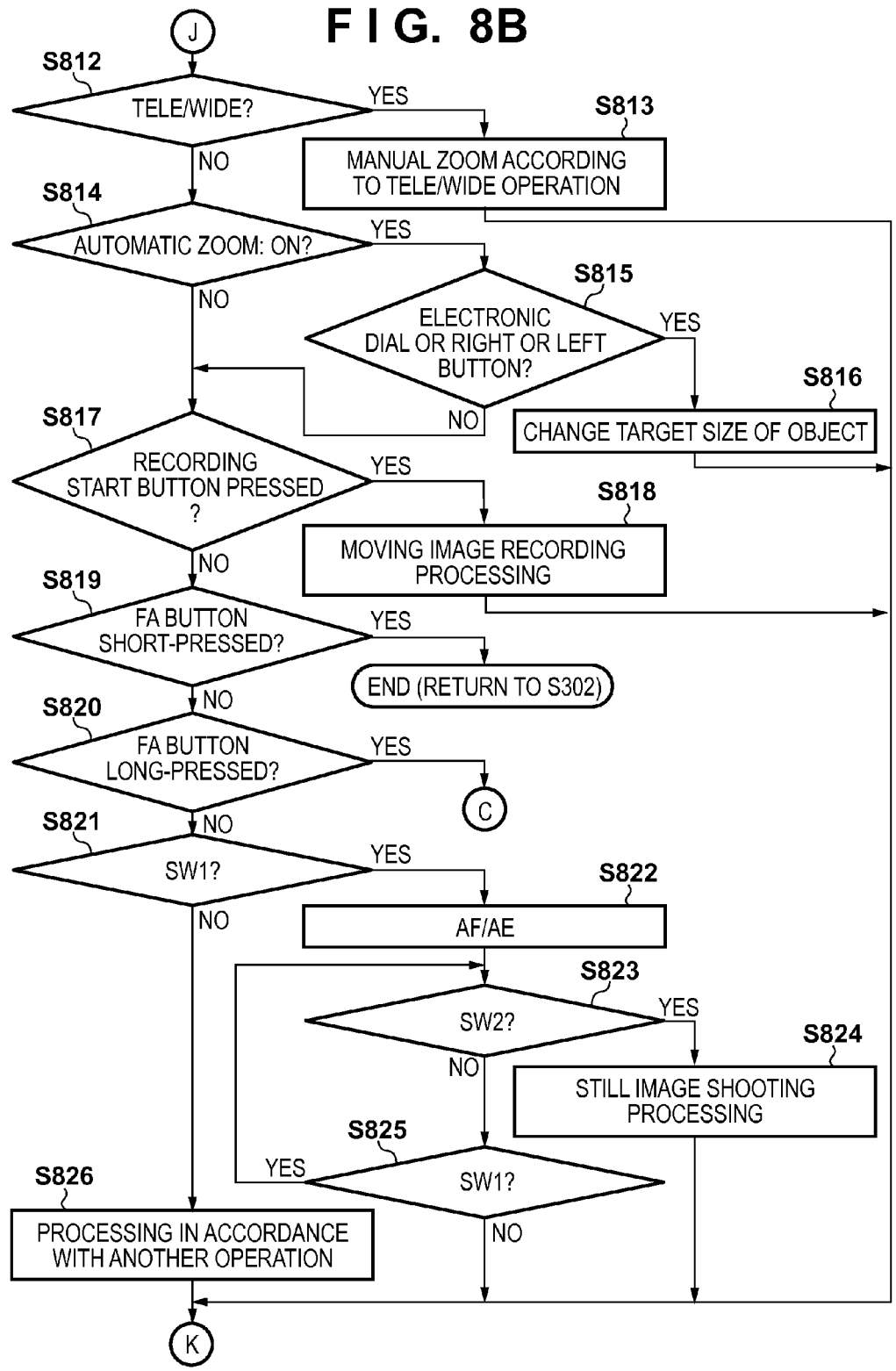

Next, search assist processing in S527 and S531 of FIG. 5A will be described with reference to FIGS. 8A and 8B.

Search assist is a function in which when a user has lost sight of an object, the system control unit 201 detects a movement made in an attempt to find the object by quickly moving the digital camera 100, automatically performs zooming-out, and performs zooming-in to the original magnification when a certain time period elapses.

In step S801, the system control unit 201 performs zooming-out of the photographing lens 203.

In step S802, the system control unit 201 determines whether or not a specific operation has been performed. In the case where the specific operation has been performed, the process proceeds to S803, and otherwise the process proceeds to S804. The specific operation is an operation determined in S812, S814, S817, S819, S820 and S821 described later.

In step S803, the system control unit 201 suspends zooming-out of the photographing lens 203.

In step S804, the system control unit 201 determines whether or not the photographing lens 203 has been zoomed out by a predetermined amount. In the case where the lens has been zoomed out, the process proceeds to S805, and otherwise the process proceeds to S801.

In step S805, the system control unit 201 stops zooming-out of the photographing lens 203, and starts timer counting.

Step S806 is similar to step S802. In the case where a specific operation has been performed, the process proceeds to SS812, and otherwise the process proceeds to S807.

Figure 7A:
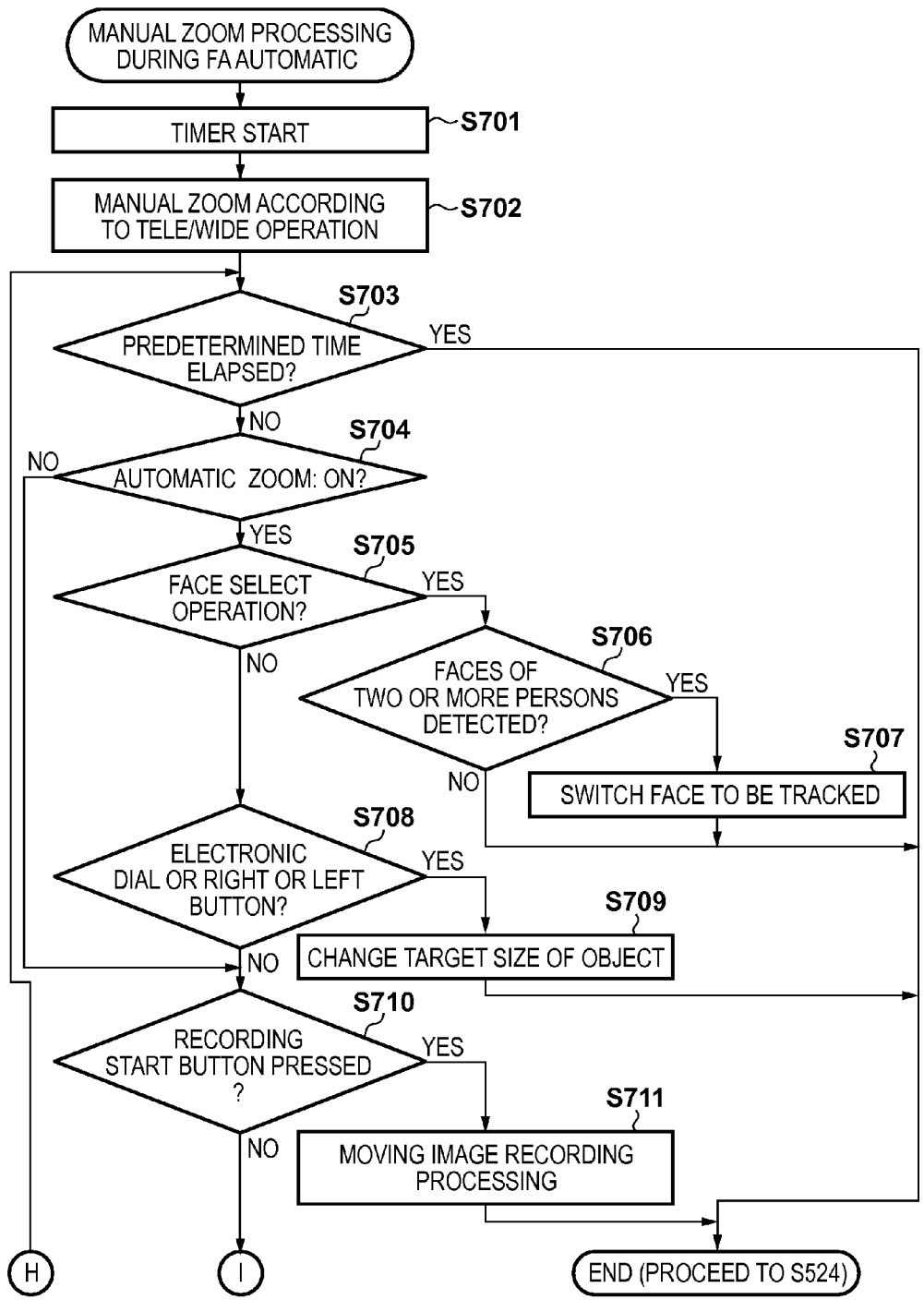

Step S807 is similar to step S703 of FIG. 7A. In the case where a predetermined time has elapsed, the process proceeds to S808, and otherwise the process proceeds to S806.

In step S808, the system control unit 201 performs zooming-in of the photographing lens 203.

Step S809 is similar to step S802. In the case where a specific operation has been performed, the process proceeds to S810, and otherwise the process proceeds to S811.

S810, the system control unit 201 suspends zooming-in of the photographing lens 203.

In step S811, the system control unit 201 determines whether or not the photographing lens 203 has been zoomed in by a predetermined amount. In the case where the lens has been zoomed in, the processing is ended, and otherwise the process proceeds to S808.

Step S812 is similar to step S509 of FIG. 5B. In the case where the operation has been performed, the process proceeds to S813, and otherwise the process proceeds to S814.

Step S813 is similar to step S702.

S814 to S816 are respectively similar to S601, S605 and S606 of FIG. 6.

Steps S817 and S818 are similar to steps S608 and S609 of FIG. 6.

Step S819 is similar to step S306 of FIG. 3A. In the case where the button has been short-pressed, the processing is ended and the process proceeds to S302 of FIG. 3A.

Step S820 is similar to step S309 of FIG. 3A. In the case where the FA button 104a has been long-pressed, the process proceeds to S310 of FIG. 3A, and otherwise the process proceeds to S821.

Steps S821 to S825 are similar to steps S314 to S318 of FIG. 3B.

In step S826, the system control unit 201 performs processing in accordance with other operations. By the menu button being pressed, for example, search assist processing and FA automatic mode processing are ended, and menu screen processing is performed. Furthermore, in the case where the forcible IS button included among the operation units 104 has been pressed, search assist processing and FA automatic mode processing are ended, and forcible IS processing is performed. Furthermore, when a function that disables display of a live view image on the display unit 101, such as a sleep function for performing display-off when a predetermined time elapses and a clock display operation, is performed, search assist processing and FA automatic mode processing are ended.

It is assumed that FA automatic mode processing can be performed while a moving image is being recorded in S313, S609 and S711. However, it is assumed that the face select and the target size cannot be changed.

Figure 9F:
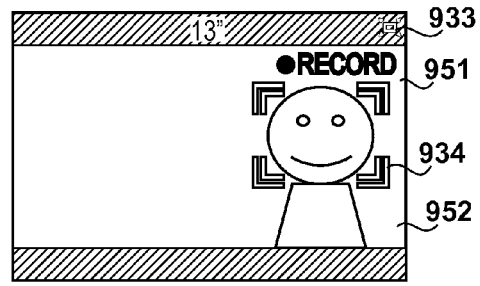

FIG. 9F illustrates a display screen in the case where FA automatic mode processing is started with automatic zooming set to other than "OFF" while a moving image is being recorded. In FIG. 9F, as OSD (display item), the FA automatic icon 933 indicating that FA automatic mode processing is being performed and a recording icon 951 indicating that a moving image is being recorded are superimposed on a live view image and displayed on the display unit 101. A tracking frame 934 indicating a tracked state is displayed on the detected face. That is, it is possible to record a moving image while using the automatic zooming function in FA automatic mode processing. Furthermore, because the target size cannot be changed while a moving image is being recorded, the target size dialog 935 is not displayed. In this manner, it is possible to prevent deterioration of visibility while a moving image is being recorded.

Note that set values of automatic zooming which are to be set in menu screen processing and set values of the target size in FA automatic mode processing are not limited to the above-described options, but for example, those set values can be expressed by specific numerical values such as percentages to the size of a live view image, or can be abstract expressions such as large, medium, or small.

Furthermore, processing in accordance with FA mode which can be performed while a moving image is being recorded can include changes of the face select and the target size.

Furthermore, a face selecting operation may be a touch operation on a touch panel.

Furthermore, at the time of starting FA automatic mode processing, a part of the shooting information display displayed on the display unit 101 in S303 of FIG. 3A is hidden, but the information display can be maintained instead.

Furthermore, an information display switch button operation can be added to the predetermined operation corresponding processing (S615) in FIG. 6. Accordingly, a user can display desired information and use the FA automatic mode.

Furthermore, in the case where the starting operation of the FA automatic mode is performed after starting recording of a moving image, all or part of the current target size dialog 935 can be displayed within a predetermined time from the start of recording of the moving image. In this manner, the user can check the current target size.

Furthermore, if FA automatic mode processing is started while a moving image is being recorded, an object is immediately determined and automatic zooming is started, and there is thus a possibility that an undesired moving image can be recorded in some cases. Accordingly, in the case where FA automatic mode processing is started while waiting for a moving image to be recorded, automatic zooming is started immediately after an object is detected, but in the case where FA automatic mode processing is started while a moving image is being recorded, automatic zooming does not have to be started immediately, and can be started after a predetermined time elapses after face detection. Because a face selecting operation and a target size changing operation are possible before the predetermined time elapses, a user can record more desirable moving images. Alternatively, after the FA automatic mode is started, an object may be actually determined and then automatic zooming may be started. What is displayed at this time is, for example, the tracking frame 934 that is blinking on an object detected first when FA automatic mode processing is started while a moving image is being recorded, and subsequently is switched to steady display when a predetermined time elapses or a determination button is pressed, or the like.

Furthermore, a UI may be prepared with which the user can change settings as for the predetermined zoom amount and the predetermined time period described in the present embodiment.

Furthermore, it has been stated earlier that processing returns to shooting mode processing in a state where FA automatic mode processing has been stopped when menu screen processing is ended in FIG. 4, but FA automatic mode processing may be temporally suspended. That is, it may be determined that, at the same time as processing returns to shooting mode processing, FA automatic mode processing is to be resumed in accordance with the set values when starting menu screen processing and the set values changed during menu screen processing, or that FA automatic mode processing is to be stopped. This can reduce work and time for a user who shifted processing to menu screen processing during FA automatic mode processing and wishes to promptly start FA automatic mode processing under the conditions of the setting changed in the menu screen processing. Furthermore, a UI may be prepared in which the user selects whether or not to resume FA automatic mode processing when menu screen processing is ended.

Furthermore, it has been stated earlier that FA automatic mode processing is ended when the forcible IS button is pressed in FIG. 6, but FA automatic mode processing may be started again when forcible IS processing is ended. Accordingly, a field angle is defined by forcible IS processing, leading to reduction in work and time for a user who wishes to use automatic zooming using FA automatic mode processing again after shooting is performed once (that is, the process proceeds to S501 of FIG. 5A). Furthermore, a UI may be prepared in which the user selects whether or not to resume FA automatic mode processing when forcible IS processing is ended.

Furthermore, it has been stated earlier that FA automatic mode processing is ended when a live view is not displayed, but FA automatic mode processing may continue. For example, in the case of recording a moving image in a state where the camera is fixed and left on a tripod stand, for example, in the case where the user wishes for automatic zooming using FA automatic mode processing but does not need to view the display, it is possible to save electricity by displaying-off. Furthermore, a UI may be prepared in which the user selects whether or not to end the FA automatic mode when the live view is not displayed.

Furthermore, the present embodiment has been described as for a case where the number of persons as an object is one, it is also desirable that a plurality of persons can be selected.

For example, it is also desirable that automatic zooming is performed so that, when a plurality of person objects are touched and selected such as by a touch operation, all the selected objects fit within a field angle. Furthermore, for example, when a plurality of objects are selected in the case where the target size is set to "whole body", automatic zooming can be performed so that not only the faces of all the person but also the whole bodies of as many of all the person as possible fit within the field angle. It may also be desirable that the options of the target size of an object are changed when a plurality of objects are selected. For example, a mode for shooting all the persons zoomed-up as much as possible, a mode for shooting persons together with a background such as a group photograph, and the like.

Furthermore, because the FA automatic mode is basically a function which is valid in a situation where an object (face) exists, automatic zooming can be automatically set to "OFF" in the case where a mode is switched to a mode for shooting landscapes (such as above-described skyrocket shooting mode and sunset shooting mode, for example). Alternatively, search assist also can be set to "OFF".

Furthermore, in the present embodiment, in the case where automatic zooming and search assist are both "OFF", zooming-out of a predetermined amount is started by the FA button 104a being long-pressed, but this can be switched to short pressing. In this case, it is also desirable to zoom-out by a predetermined amount by short pressing and to end search assist processing without performing zooming-in while preserving the field angle used at the time of zooming-out.

Furthermore, while the options of automatic zooming includes "OFF", the options of the target size in a live view image does not include "OFF". This is because, if "OFF" is selected in the process of switching the target size in a live view image in such a manner as from "face" to "upper half body" then to . . . , it is possible that the user loses sight of the object on which framing has been performed using automatic zooming so far. However, in the case where search assist is "ON" and automatic zooming is "OFF", usually only search assist is used, but allowing automatic zooming to be temporarily changed to other than "OFF" would be useful in a situation where a user wishes to temporarily use automatic zooming using face tracking. Accordingly, it is also desirable to make it possible to perform a face select operation even in the case where only search assist is "ON", so that when face selecting operation is performed, automatic zooming is automatically switched to other than "OFF".

Second Embodiment

The present invention is also applicable to a remote shooting apparatus in which a digital camera and a remote control apparatus are connected via a network, and a smartphone, a tablet, a personal computer or the like is used as the remote control apparatus. In this case, in addition to the configuration shown in FIG. 2, a communication unit for connecting with the remote control apparatus through a wireless antenna or a wired cable in a communicable manner is mounted on the digital camera 100 according to the present embodiment. The communication unit is also connectable to a wireless LAN and the Internet, can send captured images (including live view images) captured by the image capturing unit 205 or image files recorded in the recording medium 109 to a control apparatus, and also can receive from the control apparatus various types of information such as control commands and set values in accordance with a user operation.

In this manner, in the case where the digital camera according to the present embodiment is applied to a remote shooting system as a surveillance camera for security, babysitting or the like, the camera side that is remotely controlled will perform shooting of a moving image or a still image and zooming operation in shooting mode processing shown in FIGS. 3A and 3B, and a remote control apparatus that communicates with the camera will perform operation instruction for display of a live view image, designation of an object size, processing in accordance with other operations and respective processing in FIG. 5A to FIG. 8B, as well as operation corresponding processing.

Note that a single item of hardware may control the system control unit 201, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate Although the above embodiments have described an example in which the present invention is applied to an image capturing apparatus such as a digital camera, the present invention is not limited to this example. The present invention is applicable to, for example, an image capturing apparatus having a zooming control function and the like. More specifically, the present invention is applicable to a tablet, a smart phone which is a kind of a mobile telephone terminal, a PDA (Personal Digital Assistant), a mobile image viewer, a game console, an electronic book reader, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-153153, filed Jul. 28, 2014 which is hereby incorporated by reference herein in its entirety.

What is claimed is:

1. An image capturing apparatus comprising:
an image capturing unit configured to capture an image;
a display unit configured to display an image captured by the image capturing unit;
a memory and at least one processor which function as:
   a detection unit configured to detect an object from an image captured by the image capturing unit; and
   a zooming control unit configured to automatically perform zooming such that a size of the object detected in the captured image is maintained within a screen according to a set size; and
a first operation member for accepting an operation for changing the set size of the object detected in the captured image while the captured image is being displayed on the display unit,
wherein the memory and the processor function to, when an operation is received via the first operation member,
   change the set size in accordance with the received operation if the operation is received during a moving image recording stand-by or before still image shooting, and
   not change the set size even when the operation is received if the operation is received while a moving image is being recorded,
wherein even when the moving image is being recorded, the zooming control unit automatically performs zooming such that the size of the object is maintained within the screen according to the set size.

2. The apparatus according to claim 1, wherein
the zooming control unit controls such that, during the moving image recording stand-by or before still image shooting, the zooming is automatically performed in response to the detection of an object with the detection unit, and, when an object is detected with the detection unit while a moving image is being recorded, the zooming is automatically performed after a predetermined time elapses from he detection.

3. The apparatus according to claim 2, wherein
even while a moving image is being recorded, the set object is changed in accordance with the operation before the predetermined time elapses after an object is detected by the detection unit.

4. The apparatus according to claim 1, wherein the processor further functions as a selection unit configured to be capable of selecting an object a size of which is to be changed by the first operation member in a case where the detection unit detects a plurality of objects,
   wherein the detection unit displays a distinguishable frame on a detected object, and
   the zooming control unit automatically control zooming so that an object selected by the selection unit fits within a screen according to a set size.

5. The apparatus according to claim 1 wherein
the zooming control unit can perform first zooming control for automatically performing zooming so that an object detected by the detection unit fits within a screen in accordance with the set size, and second zooming control for temporarily performing zooming-out in response to a movement of the image capturing apparatus.

6. The apparatus according to claim 5, wherein
the zooming control unit tarts the second zooming control in a case where a predetermined movement of the image capturing apparatus is detected after the first zooming control is started.

7. The apparatus according to claim 5, further comprising:
a second operation member for accepting a user operation,
wherein, when a first operation on the second operation member is detected, the zooming control unit starts the first zooming control.

8. The apparatus according to claim 7, wherein
when a second operation on the second operation member is detected, the zooming control unit starts control of temporarily performing zooming-out, performs display of a frame indicating a range that corresponds to a zoom magnification used before zooming out, and continues zooming-out and display of a frame until a second operation on the second operation member is not detected.

9. The apparatus according to claim 5, wherein
the display unit displays a setting screen for performing setting regarding the first zooming control and the second zooming control in accordance with a user operation.

10. The apparatus according to claim 5, wherein
a predetermined operation can be accepted after the first zooming control is started, and the predetermined operation is a moving image recording start or an instruction of still image shooting.

11. The apparatus according to claim 7, further comprising:
a zooming instruction unit configured to accept a zooming instruction by a user operation,
wherein, in a case where the zooming instruction is accepted after the first zooming control is started, the zooming control unit suspends the first zooming control and performs zooming in accordance ith the zooming instruction.

12. The apparatus according to claim 5, wherein the processor further functions as a processing unit configured to, in a case where a predetermined instruction by a user operation is accepted after the second zooming control is started, perform processing in accordance with the predetermined instruction,
wherein the predetermined instruction is any one of a zooming instruction, the first operation, and an instruction of moving image recording start or still image shooting.

13. The apparatus according to claim 9, wherein
setting an object size is done via the setting screen, and
on the setting screen, it is possible to set, in addition to the size setting, whether or not to perform the first zooming control or the second zooming control.

14. The apparatus according to claim 5, wherein
in the first zooming control, the zooming control unit performs zooming so that an object fits within a screen in accordance with the set size, and, in a case where a position of an object is in the periphery of a screen, changes the set size to a size for periphery when performing zooming.

15. The apparatus according to claim 5, wherein
in a case where an object is detected by the detection unit after the first zooming control is started, the detection unit displays a distinguishable frame on a detected object, and the display unit displays information indicating that the first zooming control is being performed and does not display information of a size set by the setting unit.

16. The apparatus according to claim 1, wherein
the detection unit detects a face of a person as an object, and
the set size can be set to any one of a face, an upper half body, and a whole body of an object, or manual size setting.

17. The apparatus according to claim 1, further comprising:
an acceptance member for accepting an instruction to start moving image recording;
wherein when the acceptance member accepts the instruction to start moving image recording, regardless of whether an object fits within a screen according to a size set by the setting unit, recording of an image captured by the image capturing unit is started.

18. A control apparatus comprising:
a memory and at least one processor which functions as:
a communication unit configured to be capable of communicating with an image capturing apparatus; and
a control unit configured to control an operation of the image capturing apparatus via the communication unit;
a display unit configured to display an image received from the image capturing apparatus via the communication unit; and
a first operation member for accepting an operation for changing a set size of an object in the received image while the image is being displayed on the display unit,
wherein the memory and the processor function to, when an operation is received via the first operation member,
change the set size in accordance with the received operation if the operation is received during a moving image recording stand-by or before still image shooting, and
not change the set size even when the operation is received if the operation is received while a moving image is being recorded,
wherein the control unit controls the image capturing apparatus to automatically perform zooming even when the moving image is being recorded so that a size of the object is maintained within a screen in accordance with the set size.

19. A control method of an image capturing apparatus that includes an image capturing unit for capturing an image, a display unit for displaying an image captured by the image capturing unit, and a first operation member, the method comprising:
detecting an object from an image captured by the image capturing unit;
not changing a set size of an object if the first operation member is operated while a moving image is being recorded, and changing a set size of an object based on an operation on the first operation member if the first operation member is operated during a moving image recording stand-by or before still image shooting; and
automatically performing zooming even when the moving image is being recorded such that a size of an object is maintained within a screen according to the set size.

20. A control method of a control apparatus that includes a memory and at least one processor which function as a communication unit communicable with an image capturing apparatus and a control unit which controls an operation of the image capturing apparatus via the communication unit, the method comprising:
displaying an image received from the image capturing apparatus via the communication unit;
not changing a set object size if a first operation member is operated while a moving image is being recorded, and changing a set object size based on an operation on the first operation member if the first operation member is operated during a moving image recording stand-by or before still image shooting; and
controlling the image capturing apparatus to automatically perform zooming even when the moving image is being recorded such that a size of an object is maintained within a screen according to the set size.

21. A non-transitory computer-readable storage medium storing a program for causing a computer to function as a detection unit and a zooming control unit of an image capturing apparatus, the apparatus comprising:
an image capturing unit configured to capture an image;
a display unit configured to display an image captured by the image capturing unit; and
a first operation member for accepting an operation for changing a set size of an object in a captured image while the captured image is being displayed on the display unit, wherein
the detection unit is configured to detect an object from the captured image; and
the zooming control unit is configured to automatically perform zooming such that a size of the object in the captured image is maintained within a screen according to the set size,
wherein when an operation is recieved via the first operation member;
the set size is changed in accordance with the received operation if the operation is recieved during a moving image recording stand-by or before still image shooting, and
the set size is not changed even when the operation is received if the operation is received while a moving image is being recorded,
wherein even when the moving image is being recorded, the zooming control unit automatically performs zooming such that the size of the object is maintained within the screen according to the set size.

22. A non-transitory computer-readable storage medium storing a program for causing a cormputer to function as a communication unit for communicating with an image capturing apparatus and a control unit for controlling an operation of the image capturing apparatus via the communication unit of a control, apparatus, the apparatus comprising;
a display unit configured to display an image received from the image capturing apparatus via the communication unit; and
a first operation member for accepting an operation for changing a set size of an object in the received image while the image is being displayed on the display unit,
wherein when an operation is received via the first operation member:
the set size is changed in accordance with the received operation if the operation is recieved during a moving image recording stand-by or before still image shooting, and
the set size is not changed even when the operation is received if the operation is received while a moving image is being recorded, wherein the control unit controls the image capturing apparatus to automatically perform zooming even when the moving image is being recorded so that a size of the object is maintained within a screen in accordance with the set size.

* * * * *